(12) United States Patent
Fukuoka et al.

(10) Patent No.: US 8,106,130 B2
(45) Date of Patent: Jan. 31, 2012

(54) MODIFIED CONJUGATED DIENE POLYMER AND PROCESS FOR PRODUCING THEREOF

(75) Inventors: Ryoko Fukuoka, Tokyo (JP); Haruo Yamada, Yokohama (JP); Norifusa Ishimura, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 557 days.

(21) Appl. No.: 12/309,586

(22) PCT Filed: Jul. 19, 2007

(86) PCT No.: PCT/JP2007/064230
§ 371 (c)(1),
(2), (4) Date: Jan. 23, 2009

(87) PCT Pub. No.: WO2008/013090
PCT Pub. Date: Jan. 31, 2008

(65) Prior Publication Data
US 2009/0203843 A1   Aug. 13, 2009

(30) Foreign Application Priority Data

Jul. 24, 2006   (JP) ................................. 2006-201248

(51) Int. Cl.
*C08C 19/22* (2006.01)
*C08C 19/25* (2006.01)

(52) U.S. Cl. ............... 525/332.9; 525/331.9; 525/332.5; 525/332.8; 525/333.2; 525/342; 525/382; 525/379; 524/571; 524/572; 524/575; 152/564

(58) Field of Classification Search ............... 525/332.5, 525/332.9, 333.2, 342, 382; 524/571, 572
See application file for complete search history.

(56) References Cited

U.S. PATENT DOCUMENTS

| | | | |
|---|---|---|---|
| 4,501,857 A | 2/1985 | Kishimoto et al. | |
| 4,673,714 A | 6/1987 | Kishimoto et al. | |
| 5,147,951 A | 9/1992 | Kang et al. | |
| 5,508,333 A | 4/1996 | Shimizu et al. | |
| 5,527,753 A | 6/1996 | Engel et al. | |
| 5,708,092 A | 1/1998 | Schwindeman et al. | |
| 7,342,070 B2 | 3/2008 | Tsukimawashi et al. | |
| 2005/0203251 A1* | 9/2005 | Oshima et al. ................ | 525/192 |
| 2006/0004143 A1 | 1/2006 | Inagaki et al. | |

FOREIGN PATENT DOCUMENTS

| | | |
|---|---|---|
| EP | 1942120 A1 | 7/2008 |
| GB | 2241239 | 8/1991 |
| JP | 42-008704 B | 4/1942 |
| JP | 43-006636 B | 3/1943 |
| JP | 59-140211 A | 8/1984 |
| JP | 61-296001 A | 12/1986 |
| JP | 63-004841 B | 1/1988 |
| JP | 01-037970 B | 2/1989 |
| JP | 01-053851 B | 3/1989 |
| JP | 02-009041 B | 1/1990 |
| JP | 07-233217 A | 9/1995 |
| JP | H07-292161 A | 11/1995 |
| JP | 08-109219 A | 4/1996 |
| JP | 11-029659 A | 2/1999 |
| JP | 11-189616 A | 7/1999 |
| JP | 11-189616 A * | 7/1999 |
| JP | 11-349632 A | 12/1999 |
| JP | 2004-018795 A | 1/2004 |
| JP | 2004-067987 A | 3/2004 |
| JP | 2005-290355 A | 10/2005 |
| JP | 2005-344039 A * | 12/2005 |
| JP | 2005-344039 A | 12/2005 |
| JP | 2006-137858 A * | 6/2006 |
| JP | 2006-137858 A | 6/2006 |
| JP | 2006-257261 A | 9/2006 |
| WO | WO-01/23467 A | 4/2001 |
| WO | WO-03/087171 A1 | 10/2003 |
| WO | WO 2007/034785 A1 * | 3/2007 |
| WO | WO-2007/034785 A1 | 3/2007 |

OTHER PUBLICATIONS

Yasuyuki Tanaka et al. "Determination of Sequence Length Distribution in SBR", Polymer, vol. 22, p. 1721, Dec. 1981.
V. Null, "Safe Process Oils for Tires With Low Environmental Impact", KGK Kautschuk Gummi Kunststoffe 52 (12) p. 799, 1999.
Derouet et al. "Synthesis of alkoxysilyl-terminated polyisoprenes by means of "living" anionic polymerization, I. Modeling of the termination step by studying the reaction of butyllithium with various alkoxysilane reagents" Macromol. Chem. Phys. 199:1835-1842 (1998).
Lindsell et al. "Synthesis and characterization of methoxysilyl terminated polybutadienes" Polymer International 25(1):1-6 (1991).
Supplementary European Search Report for EP 07790984 (Sep. 2009).

* cited by examiner

*Primary Examiner* — Roberto Rabago
(74) *Attorney, Agent, or Firm* — Morgan, Lewis & Bockius LLP

(57) ABSTRACT

A modified conjugated diene polymer comprises a modifying group based on a low molecular weight compound having two or more tertiary amino groups and one or more alkoxysilyl groups in a molecule which bonds to a conjugated diene polymer obtained by polymerization of a conjugated diene compound or a conjugated diene polymer obtained by copolymerization of a conjugated diene compound and an aromatic vinyl compound. The process for producing the modified conjugated diene polymer comprises the steps of: polymerizing a conjugated diene compound or copolymerizing a conjugated diene compound and an aromatic vinyl compound in a hydrocarbon solvent using an alkali metal initiator and/or an alkaline earth metal initiator; and reacting active terminals of the resulting polymer with a low molecular weight compound having two or more tertiary amino groups and one or more alkoxysilyl groups in the molecule.

9 Claims, No Drawings

MODIFIED CONJUGATED DIENE POLYMER AND PROCESS FOR PRODUCING THEREOF

TECHNICAL FIELD

The present invention relates to a modified conjugated diene polymer, a process for producing the polymer, and a composition using the polymer. More particularly, the present invention relates to a modified conjugated diene polymer having a modifying group in the molecule, a process for producing the modified polymer, a composition using the modified polymer, and a tire containing the composition of the modified polymer.

BACKGROUND ART

With a recent demand for reducing fuel consumption of automobiles, there is a need for a conjugated diene polymer which exhibits low rolling resistance, excellent abrasion resistance and excellent tensile properties as a rubber material for tire, and ensures drivability represented by wet skid performance.

DISCLOSURE OF THE INVENTION

Problems to be Solved by the Invention

In order to reduce the rolling resistance of a tire, it is necessary to reduce the hysteresis loss of vulcanized rubber. As the evaluation indices for the hysteresis loss of vulcanized rubber, rebound resilience at 50 to 80° C., tan δ at 50 to 80° C., Goodrich heat buildup, and the like are used. A rubber material with large rebound resilience at 50 to 80° C. and a small tan δ at 50 to 80° C. or small Goodrich heat buildup exhibits a small hysteresis loss. Examples of the rubber material with the low hysteresis loss may include natural rubber, polyisoprene rubber, polybutadiene rubber, and the like. However, these rubber materials exhibit poor wet skid performance. As a method for reducing hysteresis loss without impairing wet skid performance, a method of introducing a modifying group into the polymer terminal of a styrene-butadiene copolymer having various structures, obtained by polymerization in a hydrocarbon solvent using an organolithium initiator, has been proposed.

WO 2001/023467 discloses a composition which is obtained by compounding silica into a modified polymer produced by reacting a polyfunctional compound having an epoxy group in the molecule with an active terminal of a rubber-like polymer. However, improvements of the hysteresis loss and abrasion resistance of the composition compounded with the silica were still insufficient.

JP-A-11-29659 and JP-A-61-296001 disclose modified polymers produced by reacting a specific amide compound with an active terminal of a rubber-like polymer and a composition of the modified polymer. Although these compositions prepared by compounding carbon black or silica into the modified polymers exhibited improved hysteresis loss and improved abrasion resistance, the degree of the improvements in those properties were still insufficient.

JP-A-7-233217 and WO 2003/087171 disclose diene rubbers into which a tertiary amino group and an alkoxysilyl group are introduced. By compounding silica or a mixture of silica and carbon black into the modified polymers, those properties can be improved in some degree. However, the composition into which silica is compounded exhibits inferior processability as compared with the composition into which carbon black is compounded, therefore, it causes the problem of an increased processing cost. Generally a polymer in which a functional group having affinity with silica is introduced tends to have poor processability in compounding and have a problem of a limitation in its use.

JP-A-2004-18795 discloses a modified polymer having a primary amino group and an alkoxysilyl group. This patent document also discloses a modified polymer of which the polymer chain has a polyfunctional monomer copolymerized therewith or at least a part of the copolymer is coupled with a coupling agent having two or more functional groups. However, these modified polymers also have a problem of poor processability due to strong affinity of the primary amino group with fillers. In addition, the process for producing the modified polymers required to a complicated hydrolysis step for producing a primary amino group.

JP-A-11-349632 discloses a diene rubber into which a methylene amino group and an alkoxysilyl group are introduced and a composition containing the modified diene rubber. Although the composition prepared by compounding carbon black and silica into the modified polymer exhibited an improved hysteresis loss and improved abrasion resistance, balanced improvement between the hysteresis loss and the wet skid performance was still insufficient.

JP-A-2005-290355 discloses a modified polymer having a tertiary amino group and an alkoxysilyl group and a composition containing the modified polymer. Although the composition prepared by compounding silica into the modified polymer exhibited an improved hysteresis loss, the degree of the improvement was still insufficient.

JP-A-11-189616 discloses a modified polymer produced by reacting a cycloaminoalkoxysilane compound with an active terminal of a rubber-like polymer and a composition of the modified polymer. Although the composition prepared by compounding carbon black and silica into the modified polymer exhibited an improved hysteresis loss and improved abrasion resistance, without impairing wet skid performance, the composition tends to exhibit poor processability.

[Patent document 1] WO 2001/023467
[Patent document 2] JP-A-11-29659
[Patent document 3] JP-A-61-296001
[Patent document 4] JP-A-7-233217
[Patent document 5] WO 2003/087171
[Patent document 6] JP-A-2004-18795
[Patent document 7] JP-A-11-349632
[Patent document 8] JP-A-2005-290355
[Patent document 9] JP-A-11-189616

Means for Solving the Problems

Objects of the present invention are to provide a modified conjugated diene polymer exhibiting an excellent balanced properties among wet skid performance, low hysteresis loss properties, abrasion resistance, and tensile strength when vulcanized, irrespective of the types and the combination of fillers being compounded to provide a process for producing the modified polymer and to provide a composition comprising the modified polymer. Another object of the present invention is to provide a tire comprising a composition of the modified polymer.

As a result of extensive studies to solve the above-mentioned problems, the inventors have found that a modified conjugated diene polymer containing specific modification groups in the molecule is capable of being kneaded under the conditions milder than the conventional conditions employed in general methods of kneading the polymer with an inorganic material or an organic material, and can thus be selected more wide range of compounding conditions and constantly produce a composition with higher performance. This finding has led to the completion of the present invention.

Specifically the present invention provides:

1. A modified conjugated diene polymer comprising a modifying group based on a low molecular weight compound having two or more tertiary amino groups and one or more alkoxysilyl groups in a molecule which bonds to a conjugated diene polymer obtained by polymerization of a conjugated diene compound or a conjugated diene polymer obtained by copolymerization of a conjugated diene compound and an aromatic vinyl compound.

2. The modified conjugated diene polymer according to item 1, wherein the polymer is represented by the following general formula (1), (2), or (3),

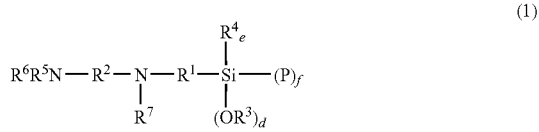

(1)

wherein P represents the conjugated diene polymer; $R^1$ and $R^2$, which may be the same or different from each other, represent a hydrocarbon group having 1 to 12 carbon atoms, which may contain an unsaturated bond; $R^3$ represents a hydrocarbon group having 1 to 20 carbon atoms, which may contain an unsaturated bond; $R^4$, $R^5$, $R^6$, and $R^7$, which may be the same or different from each other, represent a hydrocarbon group having 1 to 20 carbon atoms, which may be substituted with an organic group containing Si, O, or N and not containing an active hydrogen, and which may contain an unsaturated bond; f is an integer of 1 to 2, d is an integer of 1 to 2, and e is an integer of 0 to 1, provided that d+e+f=3.

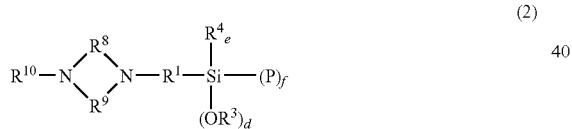

(2)

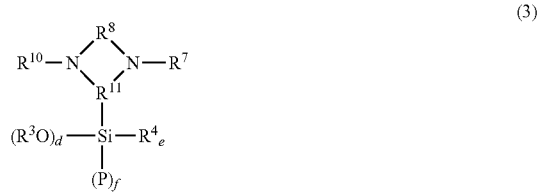

(3)

wherein P, $R^3$, $R^4$, $R^7$, d, e, and f are the same as defined in the general formula (1); $R^8$ and $R^{10}$ are the same as defined in the general formula (2); and $R^{11}$ represents a hydrocarbon group having 1 to 6 carbon atoms.

3. The modified conjugated diene polymer according to item 1, wherein the polymer is represented by the following general formula (4),

(4)

wherein P, $R^3$, $R^5$, and $R^6$ are the same as defined in the general formula (1); $R^{12}$ and $R^{13}$, which may be the same or different from each other, represent a hydrocarbon group having 1 to 12 carbon atoms, which may contain an unsaturated bond; and $R^{14}$ and $R^{15}$, which may be the same or different from each other, represent a hydrocarbon group having 1 to 20 carbon atoms, which may be substituted with an organic group containing Si, O, or N and not containing an active hydrogen, and which may contain an unsaturated bond.

4. The modified conjugated diene polymer according to item 2, wherein $R^4$ in the general formula (1), (2), or (3) is a hydrocarbon group having 1 to 20 carbon atoms, which may contain an unsaturated bond.

5. A process for producing a modified conjugated diene polymer comprising the steps of: polymerizing a conjugated diene compound or copolymerizing a conjugated diene compound and an aromatic vinyl compound in a hydrocarbon solvent using an alkali metal initiator and/or an alkaline earth metal initiator; and reacting active terminals of the resulting polymer with a low molecular weight compound having two or more tertiary amino groups and one or more alkoxysilyl groups in the molecule.

6. The process for producing the modified conjugated diene polymer according to item 5, wherein the low molecular weight compound is represented by the following general formula (5), (6), or (7) or a condensate thereof,

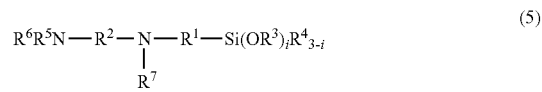

(5)

wherein $R^1$ and $R^2$, which may be the same or different from each other, represent a hydrocarbon group having 1 to 12 carbon atoms, which may contain an unsaturated bond; $R^3$ represents a hydrocarbon group having 1 to 20 carbon atoms, which may contain an unsaturated bond; $R^4$, $R^5$, $R^6$, and $R^7$, which may be the same or different from each other, represent a hydrocarbon group having 1 to 20 carbon atoms, which may be substituted with an organic group containing Si, O, or N and not containing an active hydrogen, and which may contain an unsaturated bond; and i is an integer of 1 to 3.

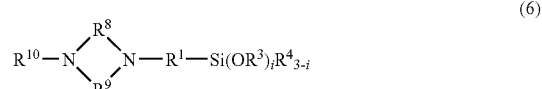

(6)

wherein $R^1$, $R^3$, and $R^4$ are the same as defined in the general formula (5); $R^8$ and $R^9$, which may be the same or different from each other, represent an aliphatic hydrocarbon group having 1 to 6 carbon atoms, which may contain an unsaturated bond; and $R^{10}$ represents a hydrocarbon group having 1 to 20 carbon atoms, which may be substituted with an organic group containing Si, O, or N and not containing an active hydrogen, and which may contain an unsaturated bond; and i is an integer of 1 to 3.

wherein $R^3$, $R^4$, and $R^7$ are the same as defined in the general formula (5); $R^8$ and $R^{10}$ are the same as defined in the general formula (6); and $R^{11}$ represents a hydrocarbon group having 1 to 6 carbon atoms; and i is an integer of 1 to 3.

7. The process for producing the modified conjugated diene polymer according to item 5, wherein the low molecular weight compound is represented by the following general formula (8) or a condensate thereof,

wherein $R^3$, $R^5$, and $R^6$ are the same as defined in the general formula (5); $R^{12}$ and $R^{13}$, which may be the same or different from each other, represent a hydrocarbon group having 1 to 12 carbon atoms, which may contain an unsaturated bond; and $R^{14}$ and $R^{15}$, which may be the same or different from each other, represent a hydrocarbon group having 1 to 20 carbon atoms, which may be substituted with an organic group containing Si, O, or N and not containing an active hydrogen, and which may contain an unsaturated bond.

8. The process for producing the modified conjugated diene polymer according to item 6 wherein the low molecular weight compound is represented by the general formula (5), (6), or (7) or a condensate thereof, in which $R^4$ represents a hydrocarbon group having 1 to 20 carbon atoms, which may contain an unsaturated bond.

9. The process for producing the modified conjugated diene polymer according to item 5, wherein the low molecular weight compound is at least one selected from the group consisting of 1-[3-(trialkoxysilanyl)-propyl]-4-alkylpiperazine, 1-[3-(alkyldialkoxysilanyl)-propyl]-4-alkylpiperazine, 1-[3-(trialkoxysilanyl)-propyl]-3-alkylimidazolidine, 1-[3-(alkyldialkoxysilanyl)-propyl]-3-alkylimidazolidine, 1-[3-(trialkoxysilanyl)-propyl]-3-alkylhexahydropyrimidine, 1-[3-(alkyldialkoxysilanyl)-propyl]-3-alkylhexahydropyrimidine, 3-[3-(trialkoxysilanyl)-propyl]-1-alkyl-1,2,3,4-tetrahydropyrimidine, and 3-[3-(alkyldialkoxysilanyl)-propyl]-1-alkyl-1,2,3,4-tetrahydropyrimidine.

10. The process for producing the modified conjugated diene polymer according to any one of items 5 to 9, wherein the active terminals of the polymer or the conjugated diene polymer is coupled with a polyfunctional modifying agent prior to, subsequent to, or concurrently with reacting the active terminals of the polymer with the low molecular weight compound.

11. The process for producing the modified conjugated diene polymer according to item 10, wherein the polyfunctional modifying agent is a glycidyl compound, which contains an amino group in a molecule.

12. A modified conjugated diene polymer composition comprising: 1 to 150 parts by weight of a reinforcing filler and 0.1 to 20 parts by weight in total of vulcanizing agent and a vulcanizing accelerator, based on 100 parts by weight of a rubber component comprising the modified conjugated diene polymer according to any one of items 1 to 4 or the modified conjugated diene polymer obtained by the process according to any one of items 5 to 11.

13. A tire comprising the modified conjugated diene polymer composition according to item 12.

Advantageous Effect of the Invention

Due to the capability of homogeneously dispersing fillers in the form of fine particles, the modified conjugated diene polymer according to the present invention can produce a composition having a preferable viscosity which makes it possible to select a more wide range of kneading conditions than the conventional ones, when various fillers are compounded. In addition, since the filler is homogeneously dispersed in the form of fine particles in the matrix of the conjugated diene polymer, the resulting composition exhibits high performance constantly. As a result, the vulcanized rubber composition obtained by vulcanizing the modified conjugated diene polymer exhibits high performance, with excellent wet skid performance and low hysteresis loss properties, which are the characteristics in a trade-off relation, as well as abrasion resistance and tensile strength in a sufficiently balanced manner, when the vulcanized rubber composition is used for a tire. In addition to the application for a tire, the vulcanized rubber composition is also suitable for shoes, a damper, and the like.

Furthermore, since fillers such as silica, carbon black, a metal oxide, and a metal hydride can be uniformly dispersed even in a case where the modified conjugated diene polymer composition according to the present invention is a thermoplastic elastomer, improvements in strength, flame retardancy, tensile strength, and transparency which have not been achieved by the conventional composition, can be achieved. For example, when the composition used in an asphalt composition, an improvement of aggregate grip and the like can be obtained. When the modified conjugated diene polymer according to the present invention is compounded with other polar resins, a high performance composition can be easily obtained due to the improved compatibility.

BEST MODE FOR CARRYING OUT THE INVENTION

Next, embodiments of the present invention will be described. The following embodiments are given in order to illustrate the present invention and should not be construed to be limiting of the present invention. The present invention can be implemented in a various manners to the extent not departing from the gist thereof.

The modified conjugated diene polymer according to the present invention comprises a modifying group based on a low molecular weight compound having two or more tertiary amino groups and one or more alkoxysilyl groups in a molecule which bonds to a conjugated diene polymer obtained by polymerization of a conjugated diene compound or a conjugated diene polymer obtained by copolymerization of a conjugated diene compound and an aromatic vinyl compound. The modified conjugated diene polymer according to the present invention can exhibit the above-mentioned excellent effects due to having specific modifying groups in the molecule.

The conjugated diene polymer which constitutes the modified conjugated diene polymer, is a homopolymer of a single conjugated diene compound, a copolymer of two or more different conjugated diene compounds, or a copolymer of a conjugated diene compound and an aromatic vinyl compound.

Examples of the conjugated diene compound may include 1,3-butadiene, isoprene, 2,3-dimethyl-1,3-butadiene, 1,3-pentadiene, 3-methyl-1,3-pentadiene, 1,3-heptadiene, 1,3-hexadiene and the like. These conjugated diene compounds may be used either alone or in combination of two or more. Preferable examples may include 1,3-butadiene and isoprene.

Examples of the aromatic vinyl compound may include styrene, p-methylstyrene, α-methylstyrene, vinyl ethylbenzene, vinyl xylene, vinyl naphthalene, diphenylethylene and the like. These aromatic vinyl compounds may be used either alone or in combination of two or more. Preferable examples may include styrene.

In order to prevent cold flow of the conjugated diene polymer, polyfunctional aromatic vinyl compounds such as divinylbenzene can also be used from the viewpoint of controlling branches.

The conjugated diene polymer may be either a random copolymer or a block copolymer. Examples of the random copolymer include a butadiene-isoprene random copolymer, a butadiene-styrene random copolymer, an isoprene-styrene random copolymer, a butadiene-isoprene-styrene random copolymer, and the like. As the compositional distribution of monomers in the copolymer chain, a complete random copolymer which is close to a statistical random composition, a tapered random copolymer in which the composition has a tapered distribution, and the like can be given. The bonding pattern of conjugated dienes, that is, the composition of 1,4-bond, 1,2-bond, and the like may be exist either uniformly or having distribution in the composition.

Examples of the block copolymers may include a 2-type block copolymer which consists of two blocks, a 3-type block copolymer which consists of three blocks, a 4-type block copolymer which has four blocks, and the like. For example, when a block which consists of an aromatic vinyl compound such as styrene is indicated by S and a block which has a conjugated diene compound such as butadiene, isoprene, and the like and/or a block which has a copolymer of an aromatic vinyl compound and a conjugated diene compound is indicated by B, these polymers can be represented by an S—B 2-type block copolymer, an S—B—S 3-type block copolymer, an S—B—S—B 4-type block copolymer, and the like. In the block copolymers represented by the above-mentioned formulas, the boundary of each block does not necessarily need to be clearly distinguished. When the block B is a copolymer of an aromatic vinyl compound and a conjugated diene compound, the aromatic vinyl compound in the block B may be either uniformly distributed or distributed in a tapered form. In addition, the block B may contain a part in which an aromatic vinyl compound is uniformly distributed and/or a part in which an aromatic vinyl compound is distributed in a tapered form. Two or more of these parts may exist in the block B. Moreover, the block B may contain two or more segments, each having a content of aromatic vinyl compound differing from the other. When there are two or more blocks S and two or more blocks B in the copolymer, the molecular weight, the structure of the composition, and the like in these two or more blocks may be either the same or different from each other.

Examples of more general structures of the block copolymer may include the structures represented by the following general formulas.

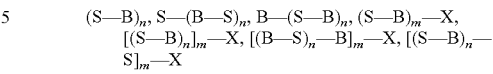

wherein n is an integer of 1 or more, and preferably 1 to 5, m is an integer of 2 or more, and preferably 2 to 11, and X represents a residue of a coupling agent or a residue of a polyfunctional initiator, provided that the structure of the polymer chains which bond to X may be either the same or different from each other.

In the present invention, the conjugated diene polymers, which constitute the modified conjugated diene copolymer, may be an arbitrary mixture of the polymers having the structures shown by the above-mentioned general formulas.

The conjugated diene polymer which constitutes the modified conjugated diene polymer according to the present invention is preferably a polymer obtained by anionic polymerization reaction, more preferably a polymer having active ends obtained by a growth reaction of living anionic polymerization.

The conjugated diene polymer which constitutes the modified conjugated diene polymer according to the present invention may be a hydrogenated conjugated diene copolymer obtained by converting all or a part of the double bonds of the conjugated diene polymer into saturated hydrocarbons. Since the modified conjugated diene polymer in which all or a part of the double bonds have been converted into saturated hydrocarbons has improved heat resistance and weather resistance, it is possible to prevent deterioration of the product when processed at a high temperature. In addition, it is possible to change mobility of molecules or to improve compatibility with other polymer compounds. As a result, such a hydrogenated modified conjugated diene polymer exhibits excellent performance in various applications such as application for automobiles.

More specifically, the degree of hydrogenation of unsaturated double bonds based on the conjugated diene compounds in the conjugated diene polymer according to the present invention can be arbitrarily selected according to the objective, without any particular limitations. In order to obtain a polymer with good heat aging resistance and weather resistance, the degree of hydrogenation of unsaturated double bonds based on the conjugated diene compounds in the conjugated diene polymer is preferably more than 70%, more preferably 75% or more, still more preferably 85% or more, and particularly preferably 90% or more. In order to improve heat stability, molecule mobility, or compatibility with other resins, the degree of hydrogenation in the conjugated diene polymer is preferably from 3 to 70%, more preferably from 5 to 65%, and still more preferably from 10 to 60%. Although there are no particular limitations, the degree of hydrogenation of aromatic double bonds based on the aromatic vinyl compound in the copolymer of a conjugated diene compound and an aromatic vinyl compound is preferably 50% or less, more preferably 30% or less, and still more preferably 20% or less. The degree of hydrogenation can be measured by using a nuclear magnetic resonance apparatus (NMR).

As the method of hydrogenation, a commonly known method can be used. A particularly preferable hydrogenation method is a method of blowing hydrogen gas into a polymer solution in the presence of a catalyst. Examples of the catalyst may include a heterogeneous catalyst such as a catalyst containing a noble metal supported on a porous inorganic material; a homogeneous catalyst such as a catalyst produced by reacting a solubilized salt of nickel, cobalt, or the like with organoaluminum or the like; a catalyst using a metallocene such as titanocene, and the like. Among these, a titanocene catalyst with which mild hydrogenation conditions can be selected is particularly preferable. Hydrogenation of aromatic groups is possible by using a noble metal-supported catalyst.

Examples of catalysts may include (1) a support-type heterogeneous hydrogenation catalyst with a metal such as Ni, Pt, Pd, Ru, or the like supported on carbon, silica, alumina, diatomaceous earth, or the like; (2) a Ziegler-type hydrogenation catalyst using a transition metal salt such as an organic acid salt of Ni, Co, Fe, Cr, or the like or an acetylacetone salt and an reducing agent such as an organoaluminum; and (3) an organic metal complex such as an organometallic compound of Ti, Ru, Rh, Zr, or the like. Specific examples may include hydrogenation catalysts described in JP-B-42-8704, JP-B-43-6636, JP-B-63-4841, JP-B-1-37970, JP-B-1-53851, JP-B-2-9041, and JP-A-8-109219. Preferable examples of the hydrogenation catalyst may include reaction mixtures of a titanocene compound and a reductive organometallic compound.

The modified conjugated diene polymer according to the present invention is preferably represented by the following general formula (1), (2), (3) or (4),

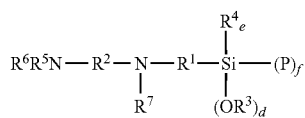
(1)

wherein P represents the conjugated diene polymer; $R^1$ and $R^2$, which may be the same or different from each other, represent a hydrocarbon group having 1 to 12 carbon atoms, which may contain an unsaturated bond; $R^3$ represents a hydrocarbon group having 1 to 20 carbon atoms, which may contain an unsaturated bond; $R^4$, $R^5$, $R^6$, and $R^7$, which may be the same or different from each other, represent a hydrocarbon group having 1 to 20 carbon atoms, which may be substituted with an organic group containing Si, O, or N and not containing an active hydrogen, and which may contain an unsaturated bond; f is an integer of 1 to 2, d is an integer of 1 to 2, and e is an integer of 0 to 1, provided that d+e+f=3.

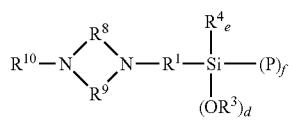
(2)

wherein P, $R^1$, $R^3$, $R^4$, d, e, and f are the same as defined in the general formula (1); $R^8$ and $R^9$, which may be the same or different from each other, represent an aliphatic hydrocarbon group having 1 to 6 carbon atoms, which may contain an unsaturated bond; and $R^{10}$ represents a hydrocarbon group having 1 to 20 carbon atoms, which may be substituted with an organic group containing Si, O, or N and not containing an active hydrogen, and which may contain an unsaturated bond.

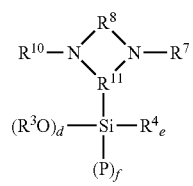
(3)

wherein P, $R^3$, $R^4$, $R^7$, d, e, and f are the same as defined in the general formula (1); $R^8$ and $R^{10}$ are the same as defined in the general formula (2); and $R^{11}$ represents a hydrocarbon group having 1 to 6 carbon atoms.

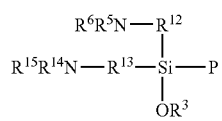
(4)

wherein P, $R^3$, $R^5$, and $R^6$ are the same as defined in the general formula (1); $R^{12}$ and $R^{13}$, which may be the same or different from each other, represent a hydrocarbon group having 1 to 12 carbon atoms, which may contain an unsaturated bond; $R^{14}$ and $R^{15}$, which may be the same or different from each other, represent a hydrocarbon group having 1 to 20 carbon atoms, which may be substituted with an organic group containing Si, O, or N and not containing an active hydrogen, and which may contain an unsaturated bond.

In the general formulas (1), (2), (3), and (4), P and $R^1$ to $R^{15}$ have meanings defined below respectively. That is, P represents a conjugated diene polymer, and $R^1$ and $R^2$ are hydrocarbon groups having 1 to 12 carbon atoms. The hydrocarbon groups may or may not contain an unsubstituted bond, and each hydrocarbon group may be either the same or different from the other hydrocarbon groups. The hydrocarbon groups may be either an acyclic hydrocarbon group or a cyclic hydrocarbon group. $R^3$ represents a hydrocarbon group having 1 to 20 carbon atoms, which may or may not contain an unsaturated bond, and may be either an acyclic hydrocarbon group or a cyclic hydrocarbon group.

$R^4$, $R^5$, $R^6$, $R^7$, $R^{10}$, $R^{14}$, and $R^{15}$ represent hydrocarbon groups having 1 to 20 carbon atoms or hydrocarbon groups having 1 to 20 carbon atoms which are substituted with an organic group containing Si, O, or N and not containing an active hydrogen. The hydrocarbon groups may or may not contain an unsubstituted bond, and each hydrocarbon group may be either the same or different from the other hydrocarbon groups. In addition, the hydrocarbon groups may be either an acyclic hydrocarbon group or a cyclic hydrocarbon group. The active hydrogen is a hydrogen which deactivates living terminals of the polymer such as SiOH, OH, NH, or $NH_2$. Examples of the hydrocarbon group substituted with an organic group containing Si may include a trialkylsilanylalkyl group, a dialkylarylsilanylalkyl group, a triarylsilanylalkyl group, a triarylsilanylaryl group, a dialkylalkoxysilanylalkyl group and the like. Examples of the hydrocarbon group substituted with an organic group containing O may include an alkoxyalkyl group, an aryloxyalkyl group, an aryloxyaryl group and the like. Examples of the hydrocarbon group substituted with an organic group containing N may include a dialkylaminoalkyl group, an alkylarylaminoalkyl group, a diarylaminoalkyl group, a dialkylaminoaryl group and the like.

$R^8$ and $R^9$ represent aliphatic hydrocarbon groups having 1 to 6 carbon atoms. These hydrocarbon groups may or may not contain an unsubstituted bond, and each hydrocarbon group may be either the same or different from the other hydrocarbon groups. $R^{11}$ represents a hydrocarbon group having 1 to 6 carbon atoms. $R^{12}$ and $R^{13}$ represent hydrocarbon groups having 1 to 12 carbon atoms. These hydrocarbon groups may or may not contain an unsubstituted bond, and each hydrocarbon group may be either the same or different from the other hydrocarbon groups. The hydrocarbon groups may be either an acyclic hydrocarbon group or a cyclic hydrocarbon group.

In the present invention, $R^1$, $R^{12}$, and $R^{13}$ has a structure containing preferably 2 to 4 carbon atoms between nitrogen of the tertiary amino group and silicon. More preferable structures are the following general formula (9).

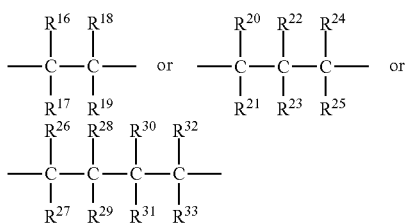

(9)

wherein $R^{16}$ to $R^{33}$ represent hydrogen atoms or hydrocarbon groups having 1 to 5 carbon atoms, each being the same or different from the others.

In regard to the structure of $R^2$, $R^8$, and $R^9$, the distance between two nitrogen atoms in the two tertiary amino groups is preferably 1 to 3 carbon atoms, wherein the carbon-carbon bond may be either a single bond or a double bond. More preferable structures are the following general formula (10),

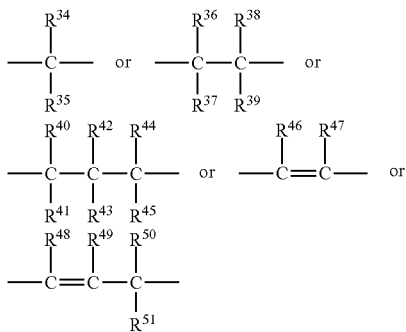

(10)

wherein $R^{34}$ to $R^{51}$ represent hydrogen atoms or hydrocarbon groups having 1 to 5 carbon atoms, each being the same or different from the others.

$R^{11}$ represents a trivalent hydrocarbon group having 1 to 6 carbon atoms, and preferably a hydrocarbon group having 1 to 4 carbon atoms.

The modified conjugated polymer according to the present invention comprising a modifying group based on a low molecular weight compound having two or more tertiary amino groups and one or more alkoxysilyl groups in the molecule bonding to a conjugated diene polymer does not include the compound having carbon-nitrogen double bond in the tertiary amino group. In the case of such a compound having a carbon-nitrogen double bond in the tertiary amino group, the excellent effect intended by the present invention cannot be obtained, because the viscosity of the polymer is increased due to side reactions caused by the carbon-nitrogen double bond, leading to impaired processability.

The modifying group bonded to the modified conjugated diene polymer according to the present invention is based on a low molecular weight compound having two or more tertiary amino groups and one or more alkoxysilyl groups in the molecule. Low molecular weight compounds are represented by the following general formulas (5) to (8), or their condensates, for example.

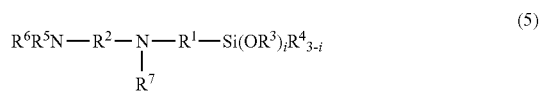

(5)

wherein $R^1$ and $R^2$, which may be the same or different from each other, represent a hydrocarbon group having 1 to 12 carbon atoms, which may contain an unsaturated bond; $R^3$ represents a hydrocarbon group having 1 to 20 carbon atoms, which may contain an unsaturated bond; $R^4$, $R^5$, $R^6$, and $R^7$, which may be the same or different from each other, represent a hydrocarbon group having 1 to 20 carbon atoms, which may be substituted with an organic group containing Si, O, or N and not containing an active hydrogen, and which may contain an unsaturated bond; and i is an integer of 1 to 3.

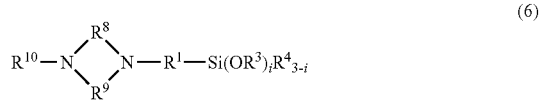

(6)

wherein $R^1$, $R^3$, and $R^4$ are the same as defined in the general formula (5); $R^8$ and $R^9$, which may be the same or different from each other, represent an aliphatic hydrocarbon group having 1 to 6 carbon atoms, which may contain an unsaturated bond; and $R^{10}$ represents a hydrocarbon group having 1 to 20 carbon atoms, which may be substituted with an organic group containing Si, O, or N and not containing an active hydrogen, and which may contain an unsaturated bond; and i is an integer of 1 to 3.

(7)

wherein $R^3$, $R^4$, and $R^7$ are the same as defined in the general formula (5); $R^8$ and $R^{10}$ are the same as defined in the general formula (6); and $R^{11}$ represents a hydrocarbon group having 1 to 6 carbon atoms; and i is an integer of 1 to 3.

(8)

wherein $R^3$, $R^5$, and $R^6$ are the same as defined in the general formula (5); $R^{12}$ and $R^{13}$, which may be the same or different from each other, represent a hydrocarbon group having 1 to 12 carbon atoms, which may contain an unsaturated bond; and $R^{14}$ and $R^{15}$, which may be the same or different from each other, represent a hydrocarbon group having 1 to 20 carbon atoms, which may be substituted with an organic group containing Si, O, or N and not containing an active hydrogen, and which may contain an unsaturated bond.

Examples of the above low molecular weight compounds may include compounds represented by the general formulas (5), (6), (7), or (8), and a condensate thereof.

In the general formulas (5), (6), (7), and (8), $R^1$ and $R^2$ represent hydrocarbon groups having 1 to 12 carbon atoms. The hydrocarbon groups may or may not contain an unsubstituted bond, and each hydrocarbon group may be either the same or different from the other hydrocarbon groups. The hydrocarbon groups may be either an acyclic hydrocarbon group or a cyclic hydrocarbon group. $R^3$ represents a hydrocarbon group having 1 to 20 carbon atoms, which may or may not contain an unsaturated bond, and may be either an acyclic hydrocarbon group or a cyclic hydrocarbon group.

$R^4$, $R^5$, $R^6$, $R^7$, $R^{10}$, $R^{14}$, and $R^{15}$ represent hydrocarbon groups having 1 to 20 carbon atoms or hydrocarbon groups having 1 to 20 carbon atoms which are substituted with an organic group containing Si, O, or N and not containing an active hydrogen. The hydrocarbon groups may or may not contain an unsubstituted bond, and each hydrocarbon group may be either the same or different from the other hydrocarbon groups. In addition, the hydrocarbon groups may be either an acyclic hydrocarbon group or a cyclic hydrocarbon group. The active hydrogen is a hydrogen which deactivates living terminals of the polymer such as SiOH, OH, NH, or $NH_2$. Examples of the hydrocarbon group substituted with an organic group containing Si may include a trialkylsilanylalkyl group, a dialkylarylsilanylalkyl group, a triarylsilanylalkyl group, a triarylsilanylaryl group, a dialkylalkoxysilanylalkyl group, and the like. Examples of the hydrocarbon group substituted with an organic group containing O may include an alkoxyalkyl group, an aryloxyalkyl group, an aryloxyaryl group, and the like. Examples of the hydrocarbon group substituted with an organic group containing N may include a dialkylaminoalkyl group, an alkylarylaminoalkyl group, a diarylaminoalkyl group, a dialkylaminoaryl group, and the like.

$R^8$ and $R^9$ represent aliphatic hydrocarbon groups having 1 to 6 carbon atoms. These hydrocarbon groups may or may not contain an unsubstituted bond, and each hydrocarbon group may be either the same or different from the other hydrocarbon groups. $R^{11}$ represents a hydrocarbon group having 1 to 6 carbon atoms. $R^{12}$ and $R^{13}$ represent hydrocarbon groups having 1 to 12 carbon atoms. These hydrocarbon groups may or may not contain an unsubstituted bond, and each hydrocarbon group may be either the same or different from the other hydrocarbon groups. The hydrocarbon groups may be either an acyclic hydrocarbon group or a cyclic hydrocarbon group.

Examples of the condensate of the low molecular weight compounds have the general formulas (5) to (8) may include compounds having a structure in which $SiOR^3$ group condensed with each other.

In the present invention, $R^1$, $R^{12}$, and $R^{13}$ has a structure containing preferably 2 to 4 carbon atoms between nitrogen of the tertiary amino group and silicon. More preferable structures are the following general formula (9),

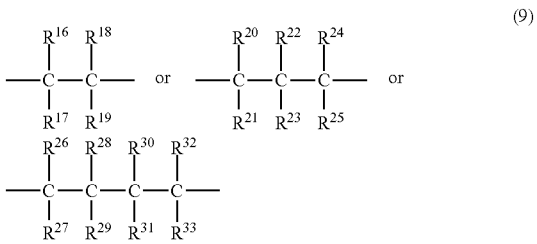

wherein $R^{16}$ to $R^{33}$ represent hydrogen atoms or hydrocarbon groups having 1 to 5 carbon atoms, each being the same or different from the others.

In regard to the structure of $R^2$, $R^8$, and $R^9$, the distance between two nitrogen atoms in the two tertiary amino groups is preferably 1 to 3 carbon atoms, wherein the carbon-carbon bond may be either a single bond or a double bond. More preferable specific structures are shown in the general formula (10),

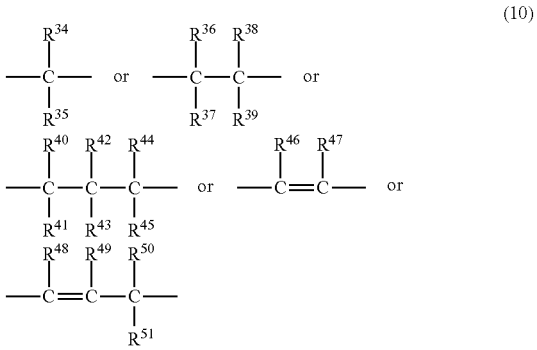

wherein $R^{34}$ to $R^{51}$ represent hydrogen atoms or hydrocarbon groups having 1 to 5 carbon atoms, each being the same or different from the others.

$R^{11}$ represents a trivalent hydrocarbon group having 1 to 6 carbon atoms, and preferably a hydrocarbon group having 1 to 4 carbon atoms.

Examples of the low molecular weight compound of the above-mentioned general formula (5) may include:
N-[2-(trialkoxysilanyl)-ethyl]-N,N',N'-trialkylethane-1,2-diamines,
N-[2-(alkyldialkoxysilanyl)-ethyl]-N,N',N'-trialkylethane-1,2-diamines,
N-[3-(trialkoxysilanyl)-propyl]-N,N',N'-trialkylpropane-1,3-diamines,
N-[3-(alkyldialkoxysilanyl)-propyl]-N,N',N'-trialkylpropane-1,3-diamines,
N-[3-(trialkoxysilanyl)-propyl]-2,N,N',N'-tetraalkylpropane-1,3-diamines,
N-[3-(alkyldialkoxysilanyl)-propyl]-2,N,N',N'-tetraalkylpropane-1,3-diamines and the like. More specific examples may include the following compounds:
N-[2-(trimethoxysilanyl)-ethyl]-N,N',N'-trimethylethane-1,2-diamine, N-[2-(dimethoxymethylsilanyl)-ethyl]-N-ethyl-N',N'-dimethylethane-1,2-diamine, N-[3-(trimethoxysilanyl)-propyl]-N,N',N'-trimethylpropane-1,3-diamine, N-[3-(dimethoxymethylsilanyl)-propyl]-N-ethyl-N',N'-dimethylpropane-1,3-diamine, N-[3-(triethoxysilanyl)-propyl]-N,N',N'-triethyl-2-methylpropane-1,3-diamine, N-[3-(dimethoxymethylsilanyl)-propyl]-2,N,N',N'- tetramethylpropane-1,3-diamine, N-(2-dimethylaminoethyl)-N'-[2-(trimethoxysilanyl)-ethyl]-N,N'-dimethylethane-1,2-diamine, N-[2-(diethoxypropylsilanyl)-ethyl]-N'-(3-ethoxypropyl)-N,N'-dimethylethane-1,2-diamine, N-[2-(trimethoxysilanyl)-ethyl]-N'-methoxymethyl-N,N'-dimethylethane-1,2-diamine, N-[2-(trimethoxysilanyl)-ethyl]-N,N'-dimethyl-N'-(2-trimethylsilanylethyl)-ethane-1,2-diamine, N-[2-(triethoxysilanyl)-ethyl]-N,N'-diethyl-N'-(2-dibutylmethoxysilanylethyl)-ethane-1,2-diamine, and the like. N-[2-(trimethoxysilanyl)-ethyl]-N,N',N'-trimethyl-ethane-1,2-diamine is a preferable compound. The modified conjugated diene polymer which is modified by this compound has particularly excellent balanced properties in wet skid performance, low hysteresis loss, abrasion resistance and tensile strength, when vulcanized.

Examples of the low molecular weight compounds of the above-mentioned general formula (6) may include:
1-[3-(trialkoxysilanyl)-propyl]-4-alkylpiperazines,
1-[3-(alkyldialkoxysilanyl)-propyl]-4-alkylpiperazines,
1-[3-(trialkoxysilanyl)-propyl]-3-alkylimidazolidines,
1-[3-(alkyldialkoxysilanyl)-propyl]-3-alkylimidazolidines,
1-[3-(trialkoxysilanyl)-propyl]-3-alkylhexahydropyrimidines,
1-[3-(alkyldialkoxysilanyl)-propyl]-3-alkylhexahydropyrimidines,
3-[3-(trialkoxysilanyl)-propyl]-1-alkyl-1,2,3,4-tetrahydropyrimidines,
3-[3-(alkyldialkoxysilanyl)-propyl]-1-alkyl-1,2,3,4-tetrahydropyrimidines and the like.
More specific examples are the following compounds:
1-[3-(triethoxysilanyl)-propyl]-4-methylpiperazine,
1-[3-(diethoxyethylsilanyl)-propyl]-4-methylpiperazine,
1-[3-(trimethoxysilanyl)-propyl]-3-methylimidazolidine,
1-[3-(diethoxyethylsilanyl)-propyl]-3-ethylimidazolidine,
1-[3-(triethoxysilanyl)-propyl]-3-methylhexahydropyrimidine,
1-[3-(dimethoxymethylsilanyl)-propyl]-3-methylhexahydropyrimidine,
3-[3-(tributoxysilanyl)-propyl]-1-methyl-1,2,3,4-tetrahydropyrimidine,
3-[3-(dimethoxymethylsilanyl)-propyl]-1-ethyl-1,2,3,4-tetrahydropyrimidine,
1-(2-ethoxyethyl)-3-[3-(trimethoxysilanyl)-propyl]-imidazolidine,
(2-{3-[3-(trimethoxysilanyl)-propyl]-tetrahydropyrimidin-1-yl}-ethyl)dimethylamine, and the like. Preferable compound may includes 1-[3-(triethoxysilanyl)-propyl]-4-methylpiperazine. The modified conjugated diene polymer which is modified by this compound has particularly excellent balanced properties in wet skid performance, low hysteresis loss, abrasion resistance and tensile strength, when vulcanized.

Examples of the low molecular weight compounds of the above-mentioned general formula (7) may include:
2-(trialkoxysilanyl)-1,3-dialkyl imidazolidine,
2-(alkyldialkoxysilanyl)-1,3-dialkylimidazolidine,
2-(trialkoxysilanyl)-1,4-dialkylpiperazine,
2-(alkyldialkoxysilanyl)-1,4-dialkylpiperazine,
5-(trialkoxysilanyl)-1,3-dialkylhexahydropyrimidine, and
5-(alkyldialkoxysilanyl)-1,3-dialkylhexahydropyrimidine and the like. More specific examples may include the following compounds:
2-(trimethoxysilanyl)-1,3-dimethylimidazolidine,
2-(diethoxyethylsilanyl)-1,3-diethylimidazolidine,
2-(triethoxysilanyl)-1,4-diethylpiperazine,
2-(dimethoxymethylsilanyl)-1,4-dimethylpiperazine,
5-(triethoxysilanyl)-1,3-dipropylhexahydropyrimidine,
5-(diethoxyethylsilanyl)-1,3-diethylhexahydropyrimidine,
{2-[3-(2-dimethylaminoethyl)-2-(ethyldimethoxysilanyl)-imidazolidin-1-yl]-ethyl}-dimethylamine,
5-(trimethoxysilanyl)-1,3-bis-(2-methoxyethyl)-hexahydropyrimidine,
5-(ethyldimethoxysilanyl)-1,3-bis-trimethylsilanylhexahydropyrimidine, and the like. A preferable compound is 2-(trimethoxysilanyl)-1,3-dimethylimidazolidine. The modified conjugated diene polymer which is modified by this compound has particularly excellent balanced properties in wet skid performance, low hysteresis loss, abrasion resistance, and tensile strength, when vulcanized.

Examples of the low molecular weight compound of the above-mentioned general formula (8) may include:
bis-(3-dialkylaminopropyl)-dialkoxysilane, bis-[(3-dialkylamino-3-methyl)propyl]-dialkoxysilane and the like. Specific examples may include the following compounds:
bis-(3-dimethylaminopropyl)-dimethoxysilane, bis-(3-ethylmethylaminopropyl)-diethoxysilane, bis-[(3-dimethylamino-3-methyl)propyl]-dimethoxysilane, bis-[(3-ethylmethylamino-3-methyl) propyl]-dimethoxysilane, and the like. A preferable compound is bis-(3-dimethylaminopropyl)-dimethoxysilane. The modified conjugated diene polymer which is modified by this compound has particularly excellent balanced properties in wet skid characteristics, low hysteresis loss, abrasion resistance and tensile strength, when vulcanized.

These low molecular weight compounds may be used either alone or in combination of two or more to react with active terminals of conjugated diene polymers obtained by polymerizing the conjugated diene compounds or copolymerizing the conjugated diene compounds and aromatic vinyl compounds. Furthermore, a condensate of the low molecular weight compound alone or in combination of two or more may be reacted with active terminals of the conjugated diene polymers.

Among the low molecular weight compounds of the above-mentioned general formulas (5) to (8), a monomer containing the low molecular weight compounds of the general formula (6) as a major component is particularly preferable, because the composition of the modified conjugated diene polymer obtained by react the low molecular weight compound with a conjugated diene polymer can exhibit excellently balanced properties in low hysteresis loss properties, wet skid performance, abrasion resistance and tensile strength, when vulcanized.

It is preferable that the low molecular weight compounds are organic compounds having a molecular weight of not more than 1,000.

The modified conjugated diene polymer according to the present invention comprises a modifying group based on a low molecular weight compound having two or more tertiary amino groups and one or more alkoxysilyl groups in a molecule which bonds to a conjugated diene polymer obtained by polymerization of a conjugated diene compound or a conjugated diene polymer obtained by copolymerization of a conjugated diene compound and an aromatic vinyl compound.

In the above-mentioned modified conjugated diene polymer, in order to exhibit excellent effects of the present invention, the amount of the modified conjugated diene polymer component which above-mentioned low molecular weight compounds bond to conjugated diene polymer is preferably from 5 to 100 wt %, more preferably from 20 to 90 wt %, and still more preferably from 50 to 90 wt % in the polymer.

In another embodiment according to the present invention, a part of the modified conjugated diene polymer may be coupled with a polyfunctional modifying agent. The modified conjugated diene polymer obtained in this manner was found to have improved cold flow properties, in addition to the above-mentioned effects. In the case of the modified conjugated diene polymer obtained by coupling with the polyfunctional modifying agent, the above effects can be particularly exhibited when the amount of the modified conjugated diene polymer component which the low molecular weight compounds bond to the conjugated diene polymer is preferably from 5 to 100 wt %, more preferably from 20 to 90 wt %, and still more preferably from 50 to 90 wt % in the polymer, and the amount of the polymer component which the conjugated diene polymer react with the polyfunctional modifying agent is preferably from 1 to 50 wt %, and more preferably from 10 to 30 wt % in the polymer. The content of the modified component can be measured by chromatography capable of separation of the component into modified one and unmodified one. Examples of the chromatographic method may include a method of analyzing the modifying group by using a GPC column packed with a filler of a polar substance such as silica, which can adsorb the modifying group component and using an internal standard of a non-adsorbing component for comparison.

Although the polystyrene-based weight average molecular weight of the modified conjugated diene polymer should be controlled according to the application or the object, a range of from 100,000 to 2,000,000 is preferable taking processability and properties into consideration. When the modified conjugated diene polymer is a non-oil-extended polymer, a more preferable polystyrene-based weight average molecular weight is from 200,000 to 1,000,000. The molecular weight distribution ($M_w/M_n$) is preferably from 1 to 3, and more preferably from 1.1 to 2.5. When the modified conjugated diene polymer is a non-oil-extended polymer, a more preferable molecular weight distribution is from 1.1 to 2.0.

The conjugated diene polymer which constitutes the modified conjugated diene polymer according to the present invention has preferably a vinyl bond (1,2-bond and/or 3,4-bond) content of from 10 to 90%. From the viewpoint of mechanical strength, abrasion resistance, and the like, a more preferable vinyl bond content is from 20 to 70%. The vinyl bond content here is a proportion of the amount of vinyl bonds to the amount of the conjugated diene monomer components. Details of measuring methods are described in Examples.

A process for producing the modified conjugated diene polymer is described below.

The modified conjugated diene polymer produced by any processes can be used. Preferable examples may include a process comprising reacting a low molecular weight compound having two or more tertiary amino groups and one or more alkoxysilyl groups in a molecule to an active terminal of the conjugated diene polymer obtained by polymerization of a conjugated diene compound or a conjugated diene polymer obtained by copolymerization of a conjugated diene compound and an aromatic vinyl compound in a hydrocarbon solvent using an alkali metal initiator and/or an alkaline earth metal initiator.

First, a polymer or copolymer of a conjugated diene compound or a copolymer of a conjugated diene polymer and an aromatic vinyl compound which constitute the modified conjugated diene polymer is produced. The conjugated diene compound, aromatic vinyl compound, and hydrocarbon solvent used for the polymerization are treated with an organo metallic compound to remove impurities such as allenes and acetylenes either alone or mixture of these before the polymerization reaction, whereby a polymer having active terminals at a high concentration can be obtained and a high modified rate can be achieved.

Examples of the hydrocarbon solvent used in the polymerization of conjugated diene polymers may include saturated hydrocarbons, aromatic hydrocarbons, and the like. Specific examples may include aliphatic hydrocarbons such as butane, pentane, hexane, pentane, and heptane; alicyclic hydrocarbons such as cyclopentane, cyclohexane, methyl cyclopentane, and methyl cyclohexane; aromatic hydrocarbons such as benzene, toluene, and xylene and the like as well as mixtures of these hydrocarbons. Of these, hexane and cyclohexane are preferable.

Examples of the alkali metal initiator and alkaline earth metal initiator used for the polymerization of conjugated diene polymers may include all alkali metal initiators and alkaline earth metal initiators with the capability of initiating polymerization. In particular, at least one compound selected from the group consisting of organoalkali metal compounds and organoalkaline earth metal compounds is preferably used.

Preferable examples of the organic alkali metal compound may include an organolithium compounds. Examples of the organolithium compounds may include, low molecular weight organolithium compounds, organolithium compounds of solubilized oligomers, mono-organolithium compounds having one independent lithium atom in one molecule and polyfunctional organolithium compounds having two or more lithium atoms in one molecule. When a mono-organolithium compound is used as an initiator, a modified conjugated diene polymer having a modifying group based on a low molecular weight compound bonded to one terminal of the conjugated diene polymer is obtained; and when a polyfunctional organolithium compound is used as an initiator, a modified conjugated diene polymer which bonds to having low molecular weight compounds bonded to the two or more terminals of the conjugated diene polymer is obtained. In regard to the bonding form of an organic group and lithium, organolithium compounds having a carbon-lithium bond, a nitrogen-lithium bond, a tin-lithium bond, and the like are included.

Examples of the mono-organolithium compound may include n-butyllithium, sec-butyllithium, tert-butyllithium, n-hexyllithium, benzyllithium, phenyllithium, stilbenelithium and the like. Examples of the polyfunctional organolithium compounds may include 1,4-dilithiobutane, reaction products of sec-butyl lithium and diisopropenylbenzene, 1,3,5-trilithiobenzene, reaction products of n-butyl lithium, 1,3-butadiene, and divinylbenzene, and reaction products of n-butyllithium, polyacetylene compound and the like. Examples of the compound having a nitrogen-lithium bond may include dimethylaminolithium, dihexylaminolithium, diisopropylaminolithium, hexamethyleneiminolithium and the like.

Organoalkali metal compounds disclosed in U.S. Pat. No. 5,708,092, BP 2,241,239, and U.S. Pat. No. 5,527,753 can also be used.

Particularly preferable compounds are n-butyllithium or sec-butyllithium. These organiolithium compounds may be used either alone or in combination of two or more.

Examples of other organoalkali metal compounds may include organosodium compounds, organopotassium compounds, organorubidium compounds, organocesium compounds, and the like. Specific compounds may include sodium naphthalene and potassium naphthalene. In addition, an alkoxide, a sulfonate, a carbonate, or an amide of lithium, sodium, and potassium, or the like can be used. Also, the organoalkali metal compounds may be used together with other organometallic compounds.

On the other hand, examples of the typical organoalkaline earth metal compounds may include organomagnesium compounds, organocalcium compounds, and organostrontium compounds. Specific examples may include dibutylmagnesium, ethylbutylmagnesium, propylbutylmagnesium and the like. An alkoxide, a sulfonate, a carbonate, an amide of an alkaline earth metal and the like can also be used.

These organoalkaline earth metal compounds may be used together with an organoalkali metal initiator or other organometallic compounds.

The conjugated diene polymer which constitutes of a modified conjugated diene polymer can be obtained by polymerizing the above-mentioned conjugated diene compounds and aromatic vinyl compounds, using the above-mentioned alkali metal initiator and/or alkaline earth metal initiator. As the polymerization method, an anionic polymerization reaction is preferable; particularly a method of obtaining active terminals by a growth reaction by living anionic polymerization is preferable. The polymerization is preferably carried out by batch polymerization or a continuous polymerization system with in which one reactor or two or more reactors connected are used. Although either increasing temperature polymerization in which the temperature is increased during the polymerization or constant-temperature polymerization can be used, the polymerization temperature is preferably from −20 to 200° C., more preferably from 0 to 150° C., and still more preferably from 10 to 120° C.

It is also possible to add a small amount of a polar compound in order to randomly copolymerize an aromatic vinyl compound and a conjugated diene compound, to control the microstructure of a conjugated diene unit, and to improve the rate of polymerization, and the like.

Examples of the polar compound may include ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxy benzene, and 2,2-bis(2-oxolanyl)propane; tertiary-amine compounds such as tetramethylethylenediamine, dipiperidinoethane, trimethylamine, triethylamine, pyridine, and quinuclidine; alkali metal alkoxide compounds such as potassium tert-amylate, potassium tert-butylate, sodium tert-butylate, and sodium amylate; phosphine compounds such as triphenylphosphine; and the like. These polar compounds may be used either alone or in combination of two or more.

The amount of the polar compound used may be appropriately selected according to the object and the degree of the effect. Generally, an amount of from 0.01 to 100 mols based on one mol of the initiator is preferable. Many polar compounds have a randomization effect in the copolymerization of a conjugated diene compound and an aromatic vinyl compound, as well as the effect of controlling the microstructure of a conjugated diene unit, and can be used as a control reagent of distribution of an aromatic vinyl compound and a control reagent of the amount of styrene blocks. As the method for randomization, a method of intermittently adding a part of 1,3-butadiene during copolymerization, disclosed in JP-A-59-140211, may be used.

A preferable process for producing a modified conjugated diene polymer is a process which comprises reacting the active terminals of the conjugated diene polymer obtained above with a low molecular weight compound of the above-mentioned general formulas (5) to (8).

It is preferable to use the low molecular weight compound in an amount of from 0.1 to 5 times mol based on one mol of the active terminal of the conjugated diene polymer. When the amount of the low molecular weight compound is less than 0.1 time mol, the vulcanized rubber made from the resulting modified conjugated diene polymer composition obtained by the present invention cannot have excellently balanced properties of low hysteresis loss properties, abrasion resistance, and tensile strength. When the amount of the low molecular weight compound is more than 5 times mol, not only modification cost increases, but also problems in removing unreacted materials and the like occur. A more preferable amount is from 0.2 to 4 times mol, with a still more preferable amount is from 0.2 to 3 times mol.

In order to exhibit excellent effects of the present invention, the content of the modified conjugated diene polymer component in which the low molecular weight compounds bond to conjugated diene polymer is preferably from 5 to 100 wt %, more preferably from 20 to 90 wt %, and still more preferably from 50 to 90 wt % in the polymer. The content of the modified component can be measured by chromatography capable of separation of the component into modified one and unmodified one. Preferable examples of the chromatographic method may include a method of quantitatively analyzing the modifying group by using a GPC column packed with a filler of a polar substance such as silica, which can adsorb the modifying group component, and using an internal standard of a non-adsorbing component for comparison.

Either a method of adding the low molecular weight compound to the polymerization reactor after the end of polymerization or a method of adding the low molecular weight compound to a pipe which transfer the polymer solution or transferring another reactor after the end of polymerization can be employed. The reaction temperature of modifying the conjugated diene polymer is preferably from 0 to 150° C., more preferably from 10 to 100° C., and still more preferably from 20 to 90° C. The low molecular weight compound is preferably reacted promptly after the end of the polymerization of the conjugated diene polymer.

A coupling reaction may be carried out in the present invention using a polyfunctional modifying agent. Coupling the conjugated diene polymer or a part of the conjugated diene polymer with a polyfunctional modifying agent improves cold flow properties. There are no specific limitations to the order of reacting the polyfunctional modifying agent. A method of coupling a polyfunctional modifying agent with the conjugated diene polymer, followed by reacting the low molecular weight compounds with the remaining active terminals, a method of reacting the low molecular weight compound with the conjugated diene polymer, followed by coupling a polyfunctional modifying agent with the remaining active terminals, or a method of reacting both the low molecular weight compound and the polyfunctional modifying agent can be used. The method of coupling a polyfunctional modifying agent with the conjugated diene polymer, followed by reacting the low molecular weight compounds with the remaining active terminals is particularly preferable in order to produce a polymer having a modifying group-containing polymer at a high ratio.

Preferable examples of the polyfunctional modifying agent may include a compound having at least one functional group selected from the group consisting of an epoxy group, a carbonyl group, a carboxylate group, a carboxylic acid amide group, an acid anhydride group, a phosphate group, a phosphite group, an epithio group, a thiocarbonyl group, a thiocarboxylate group, a dithiocarboxylate group, a thiocarboxylic acid amide group, an imino group, an ethyleneimino group, a halogen group, an alkoxy silyl group, an isocyanate group, a thioisocyanate group, a conjugated diene group, and an aryl vinyl group.

In calculating the number of mols of functional groups, the epoxy group, carbonyl group, epithio group, thiocarbonyl group, imino group, ethyleneimino group, halogen group, conjugated diene group, aryl vinyl group, and the alkoxy group per one alkoxy silyl group are counted as mono-functional groups, the carboxylate group, carboxylic acid amide group, acid anhydride group, thiocarboxylate group, dithiocarboxylate group, thiocarboxylic acid amide group, isocyanate group, and thioisocyanate group are counted as bi-functional groups, and the phosphate group and phosphorous acid ester group are counted as tri-functional groups. A polyfunctional modifying agent preferably used in the present invention has two or more sum of functional number of the above-mentioned functional groups in one molecule. It is more preferable that the total sum of the functional number in the polyfunctional modifying agent is three or more.

Specific examples of the polyfunctional modifying agent may include polyglycidyl ether of a polyhydric alcohol such as ethylene glycol diglycidyl ether and glycerol triglycidyl ether; polyglycidyl ether of an aromatic compound having two or more phenyl groups such as diglycidylated bisphenol A; polyepoxy compounds such as 1,4-diglycidyl benzene, 1,3,5-triglycidylbenzene, and polyepoxidated liquid polybutadiene; epoxy-containing tertiary amine group such as 4,4'-diglycidyl diphenyl methylamine and 4,4'-diglycidyl dibenzyl methylamine; glycidyl amino compounds such as diglycidyl aniline, diglycidyl-o-toluidine, tetra-glycidyl-m-xylene diamine, tetraglycidyl aminodiphenylmethane, tetraglycidyl-p-phenylenediamine, diglycidyl aminomethyl cyclohexane, and tetraglycidyl-1,3-bisaminomethyl cyclohexane; and compounds having an epoxy group and another functional group such as 3-glycidoxypropyltrimethoxysilane, 3-glycidoxypropyltriethoxysilane, 3-glycidoxypropyltributoxysilane, epoxy-modified silicone, epoxidized soybean oil, and epoxidated linseed oil.

Examples may include alkoxysilane compounds such as tetramethoxysilane, tetraethoxysilane, tetrabutoxysilane, and alkyltriphenoxysilane; and compounds having an imino group and an alkoxysilyl group such as N-(1,3-dimethylbutylidene)-3-(triethoxysilyl)-1-propaneamine, N-(1,3-dimethylbutylidene)-3-(tributoxysilyl)-1-propaneamine, N-(1-methylpropylidene)-3-(triethoxysilyl)-1-propaneamine, N-ethylidene-3-(triethoxysilyl)-1-propaneamine, and N-(3-triethoxysilylpropyl)-4,5-dihydroimidazole.

Furthermore, examples may include isocyanate compounds such as 2,4-tolylene diisocyanate, 2,6-tolylene diisocyanate, diphenylmethane diisocyanate, diphenylethane diisocyanate, and 1,3,5-benzene triisocyanate.

Examples may include halogenated silane compounds such as tetrachlorosilane, tetrabromosilane, tetraiodosilane, monomethyl trichlorosilane, monoethyl trichlorosilane, monobutyl trichlorosilane, monohexyl trichlorosilane, monomethyl tribromosilane, and bistrichlorosilylethane; alkoxy halogenated silane compounds such as monochlorotrimethoxysilane, monobromotrimethoxysilane, dichlorodimethoxysilane, dibromodimethoxysilane, trichloromethoxysilane, tribromomethoxysilane and the like.

Moreover, examples may include halogenated tin compounds such as tinchloride, tinbromide, monomethyl trichlorostannum, monoethyl trichlorostannum, monobutyl trichlorostannum, monophenyl trichlorostannum, and bistrichloro stanyl ethane; polyhalogenated phosphorus compounds such as trichlorophosphine and tribromophosphine; phosphite compounds such as trisnonylphenyl phosphite, trimethyl phosphite, and triethyl phosphite; and phosphate compounds such as trimethyl phosphate and triethyl phosphate.

Examples may include carboxylate compounds such as dimethyl adipate, diethyl adipate, dimethyl terephthalate, diethyl terephthalate, dimethyl phthalate, and dimethyl isophthalate; acid anhydride group-containing compounds such as pyromellitic anhydride and styrene-maleic anhydride copolymer; amide group-containing compounds such as bis-dimethylamide adipate and dimethylamide polymethacrylate; carbonyl group-containing compounds such as 4,4'-diacetylbenzophenone and 3-acetylpropoxy trimethoxysilane; aryl vinyl group-containing compounds such as divinylbenzene, diisopropenylbenzene, and divinylbenzene oligomer; and halogenated hydrocarbon group-containing compounds such as trichloropropane, tribromopropane, tetrachlorobutane, and 3-chloropropoxytrimethoxysilane. These compounds may be used either alone or in combination of two or more.

More preferable polyfunctional modifying agents may include a compound having a functional group with strong affinity with silica, and a tetra- to hexa-functional polyepoxy compound or a compound having both an epoxy group and an alkoxysilyl group with a tetra- to hexa-functionality in total, which exhibits a large molecular weight effect by coupling. Preferable compounds may include a glycidyl compound which contains an amino group in the molecule, in addition, a compound having two or more diglycidyl amino group in one molecule, for example, tetraglycidyl m-xylene diamine, tetraglycidyl aminodiphenylmethane, tetraglycidyl p-phenylenediamine, diglycidyl aminomethyl cyclohexane, and tetraglycidyl 1,3-bisaminomethyl cyclohexane. The polyfunctional modifying agent may be used either alone or in combination of two or more.

It is preferable to use the polyfunctional modifying agent in an amount of from 0.005 to 3 times mol based on one mol of the active terminal of the conjugated diene polymer. A more preferable amount is from 0.01 to 2 times mol, with a still more preferable amount being from 0.01 to 1 time mol.

The modified conjugated diene polymer according to the present invention comprises a content of the modified conjugated diene polymer component in which the low molecular weight compounds having two or more tertiary amino groups and one or more alkoxysilyl groups bonds to the conjugated diene polymer being preferably from 5 to 100 wt %, more preferably from 20 to 90 wt %, and still more preferably from 50 to 90 wt % in the polymer. Furthermore, the content of the polymer component in which the conjugated diene polymer reacts with the polyfunctional modifying agent is preferably from 1 to 50 wt %, and more preferably from 10 to 30 wt % in the polymer. In addition, it is preferable that the modified polymer component in which the low molecular weight compound having two or more tertiary amino groups and one or more alkoxy silyl groups react with, and the modified polymer component in which the polyfunctional modifying agent react with the conjugated diene polymer, in a total, being from 50 to 100 wt % in the polymer.

A reaction terminator may be added to the modified conjugated diene polymer solution of the present invention, if necessary. Examples of the reaction terminator may generally include alcohols such as methanol, ethanol, and propanol, organic acids such as stearic acid, lauric acid, and octanoic acid, water, and the like.

Moreover, it is possible to decalcify metals contained in the modified conjugated diene polymer, if necessary. Examples of the common decalcifying method may include a method of extracting metals by causing the polymer solution to come in contact with water, an organic acid, an inorganic acid, or an oxidizer such as hydrogen peroxide, and separating the aqueous layer.

Furthermore, an antioxidant may be added to the modified conjugated diene polymer. Preferable examples of the method for adding an antioxidant may include a method of adding an antioxidant to a solution of the modified conjugated diene polymer in an inactive solvent. Examples of the antioxidant may include a phenol-based stabilizer, a phosphorus-based stabilizer, and a sulfur-based stabilizer.

As a raw-material rubber for vulcanized rubbers, the Mooney viscosity is controlled to 20 to 100 according to the objective. When the Mooney viscosity is too high, the Mooney viscosity is adjusted in this range by extending the rubber with oil, taking ease of finishing operation in the production process into consideration and in order to improve processability at the time of kneading, to improve dispersibility of a filler, and to improve various properties because of good dispersibility. Preferable examples of the extender oil may include aromatic oil, naphthenic oil, paraffin oil, and an aromatic oil substitute containing 3 wt % or less polycyclic aromatic component according to the method of IP346. Examples of the aromatic oil substitute may include TDAE, MES, and the like described in Kautschuk Gummi Kunststoffe 52(12) 799 (1999), SRAE manufactured by Japan Energy Corp., and the like. Although an amount of extender oil is optional, the extender oil is generally used in an amount of from 10 to 50 parts by weight based on 100 parts by weight of the polymer, and more commonly from 20 to 37.5 parts by weight.

In the present invention, the modified conjugated diene polymer is typically obtained as a solution of the solvent used for the reaction. The modified conjugated diene polymer can be obtained from the solution by the known method. For example, a method of obtaining the polymer by filtering after separating the solvent by steam-stripping or the like, and further dehydrating and drying the polymer, a method of condensing the polymer, followed by devolatilization using a vent extruder or the like, or a method of directly devolatilizing using a drum drier or the like can be employed.

A modified conjugated diene random copolymer which is one of preferred embodiment of the present invention, will now be explained in detail.

A living conjugated diene homopolymer or a living random copolymer of a conjugated diene and styrene is obtained by using a conjugated diene or a mixture of a conjugated diene and styrene as a monomer, and an organic monolithium compound as an initiator in an inert solvent. The conjugated diene polymer has preferably a glass transition temperature of from −100° C. to 0° C. and the conjugated diene unit has a ratio of 1,4-bond to 1,2-bond/3,4-bond in a range of from 10/90 to 90/10. The bonded styrene content in the conjugated diene polymer is preferably in a range of from 0 wt % to 50 wt %. The chain distribution of styrene in the copolymer preferably has a complete random structure. Namely, it is preferable that the amount of isolated styrene (one styrene unit) obtained by ozonolysis be 40 wt % or more of all bonded styrenes, and the amount of chain styrene (a chain consisting of eight or more styrenes) be preferably 5 wt % or less, and more preferably 2.5 wt % or less of all bonded styrenes. In order to improve the random property of the conjugated diene and styrene, it is possible to add the conjugated diene intermittently to the solution during the polymerization. Examples of the method for reacting a low molecular weight compound and a polyfunctional modifying agent to the conjugated diene polymer may include a method of adding a low molecular weight compound having two or more tertiary amino groups and one or more alkoxysilyl groups to the polymer solution after completion of the polymerization and stirring the mixture to homogenize, and a method of adding predetermined amount of a polyfunctional modifying agent, of which the sum of functionality is preferably three or more, reacting the mixture with stirring, adding a low molecular weight compound having two or more alkoxysilyl groups and one or more tertiary amino groups to the remaining living polymer, and stirring the mixture to homogenize.

A modified conjugated diene block copolymer is another preferred embodiment of the present invention.

Moreover, according to the present invention it is possible to obtain a composition comprising two or more modified conjugated diene polymers, each obtained by causing a low molecular weight compound having two or more tertiary amino groups and one or more alkoxysilyl groups in a molecule and a polyfunctional modifying agent to independently react with active terminals of the conjugated diene polymer obtained by polymerizing the conjugated diene compound or copolymerizing the conjugated diene compound and the aromatic vinyl compound.

An excellent effect can be obtained when the filler selected from the group consisting of a silica-based inorganic filler, a metal oxide, and a metal hydroxide is dispersed in the modified conjugated diene polymer according to the present invention. A particularly preferable effect is obtained when synthetic silicic acid with a primary particle diameter of 50 nm or less is used as the silica-based inorganic filler. The fine particles of the filler are promptly and homogeneously dispersed in a short period of time with excellent reproducibility to produce a product with extremely good properties.

The silica-based inorganic filler can also be suitably used as a reinforcing filler in the case where the modified conjugated diene polymer of the present invention is used for the application of a vulcanized rubber such as auto-parts (e.g. tires, damper), shoes, and the like. In this case, synthetic silicic acid with a primary particle diameter of 50 nm or less is preferable. Preferable examples of the synthetic silicic acid may include wet silica and dry silica.

Also, carbon black may be used as the reinforcing filler. There are no particular limitations on the carbon black used. Examples of the carbon black may include furnace black, acetylene black, thermal black, channel black, graphite, and the like. Of these, furnace black is particularly preferable.

The modified conjugated diene polymer according to the present invention can be used as a vulcanized rubber by adding from 1 to 150 parts by weight of a silica-based inorganic filler and from 1 to 150 parts by weight of carbon black, either alone or in combination, based on 100 parts by weight of the polymer. Such a vulcanized rubber particularly allows excellent dispersion of silica and stably exhibits excellent performance. This is one of the excellent effects of the present invention. Specifically, when producing the vulcanized rubber, the inorganic filler and carbon black are homogeneously dispersed to obtain a rubber composition with small strain-dependability of storage modulus of elasticity.

The modified conjugated diene polymer according to the present invention is compounded alone or in combination with another rubber, as required. When used in combination with another rubber, the effect of the improvement of the present invention is not sufficiently exhibited, if the amount of the modified conjugated diene polymer according to the present invention is too small. As a rubber component, a weight ratio of the modified conjugated diene polymer according to the present invention and another rubber is generally from 10/90 to 95/5, preferably from 20/80 to 90/10, more preferably from 30/70 to 80/20. Examples of other rubber may include natural rubber, polyisoprene rubber, emulsion polymerized styrene-butadiene copolymer, solution polymerized random SBR (bonded styrene: from 5 to 50 wt %, 1,2-bond content in the butadiene unit: from 10 to 80 wt %), high-trans SBR (1,4-trans bond content in the butadiene unit: from 70 to 95 wt %), low-cis polybutadiene rubber, high-cis polybutadiene rubber, high-trans polybutadiene rubber (1,4-trans bond content in the butadiene unit: from 70 to 95 wt %), styrene-isoprene copolymer, butadiene-isoprene copolymer, solution polymerized random styrene-butadiene-isoprene copolymer, emulsion polymerized random styrene-butadiene-isoprene copolymer, emulsion polymerized styrene-acrylonitrile-butadiene copolymer, acrylonitrile-butadiene copolymer, and block copolymers such as high vinyl SBR-low vinyl SBR block copolymer and polystyrene-polybutadiene-polystyrene block copolymer. These may be selected suitably according to the desired properties.

A silane coupling agent may be compounded to the modified conjugated diene polymer composition according to the present invention. In order to strengthen the coupling effect (a mutual bonding effect) between the reinforcing silica filler and raw material rubber, an organic silane coupling agent is added preferably in an amount of from 0.1 to 20 wt % based on the amount of the silica-based filler. The addition of the organic silane coupling agent in the amount of this range can provide the coupling effect without ruining the reinforcing effect. A more preferable amount of the organic silane coupling agent is from 0.1 to 6 wt % based on the amount of the silica-based filler.

The organic silane coupling agent possesses a group having affinity with the surface of silica and a group capable of bonding with double bonds in the polymer molecule. Examples of the organic silane coupling agent may include bis-[3-(triethoxysilyl)propyl)-tetrasulfide, bis-[3-(triethoxysilyl)-propyl)-disulfide, bis-[2-(triethoxysilyl)ethyl]-tetrasulfide, 3-mercaptopropyl-trimethoxysilane, 3-triethoxysilylpropyl-N,N-dimethylthiocarbamoyl tetrasulfide, 3-triethoxysilylpropylbenzothiazole tetrasulfide, and the like. Since the modified conjugated diene polymer having a specific modifying group according to the present invention exhibits a strong bonding force with the silica-based filler, it is possible to omit the addition of an organic silane coupling agent or to add smaller amount of the organic silane coupling agent as compared with the case where other polymers were used. In this case, it is possible to obtain a rubber composition with higher performance.

Furthermore, rubber additives such as reinforcing filler, a vulcanizing agent, a vulcanization accelerator, a vulcanization assistant, oil, and the like can be used.

Although not particularly limited, examples of the vulcanizing agent may include sulfurs such as powdered sulfur, precipitated sulfur, colloidal sulfur, insoluble sulfur, and highly dispersible sulfur; halogenated sulfurs such as sulfur monochloride and sulfur dichloride; and organic peroxides such as dicumyl peroxide and di-tert-butyl peroxide. Of these, sulfurs are preferable, with particularly preferable sulfur being powdered sulfur.

The amount of the vulcanizing agent is generally from 0.1 to 15 parts by weight, preferably from 0.3 to 10 parts by weight, and still more preferably from 0.5 to 5 parts by weight based on 100 parts by weight of the rubber components.

Examples of the vulcanization accelerator may include a sulfene-amide vulcanization accelerator, a thiourea vulcanization accelerator, a thiazole vulcanization accelerator, a dithiocarbamic acid vulcanization accelerator, a xanthogenic acid vulcanization accelerator, and the like. The amount of the vulcanization accelerator is generally from 0.1 to 15 parts by weight, preferably from 0.3 to 10 parts by weight, and still more preferably from 0.5 to 5 parts by weight based on 100 parts by weight of the rubber components.

Although there are no specific limitations on the type of the vulcanization assistant, stearic acid, zinc oxide, and the like can be used.

The reinforcing filler may be compounded into an amount of from 1 to 150 parts by weight based on 100 parts by weight of rubber components, and the vulcanizing agent and vulcanization accelerator may be added in total in an amount of from 0.1 to 20 parts by weight based on 100 parts by weight of rubber components, for example.

Examples of the oil may include an extender oil such as aromatic extender oil, naphthenic extender oil, paraffinic extender oil, and a silicone extender oil according to applications. The amount of the extender oil is generally from 1 to 150 parts by weight, preferably from 2 to 100 parts by weight, and more preferably from 3 to 60 parts by weight based on 100 parts by weight of the rubber components. When the amount of the oil used is in this range, the dispersing effect of the reinforcing filler, tensile strength, abrasion resistance, heat resistance, and the like are excellently balanced.

In addition to the above-mentioned components, the vulcanized rubber composition, in which the modified conjugated diene polymer according to the present invention is used, may comprise, according to the conventional method, required amounts of other additives like a filler such as calcium carbonate and talc, an amine-based or phenol-based antioxidant, an antiozonant, an activator such as diethylene glycol, a processing aid, a tackifier, wax, and the like.

The vulcanized rubber composition, in which the modified conjugated diene polymer according to the present invention is used, can be produced by mixing the above-mentioned components using the known rubber-kneading machine such as a roll or a Bumbury's mixer.

A masterbatch can be prepared by compounding various additives such as a silica-based filler and carbon black, as required, to the modified conjugated diene polymer according to the present invention. A rubber composition with good processability, high strength, low rolling resistance, excellent wet skid performance, and excellent abrasion resistance can be obtained by producing the masterbatch.

The modified conjugated diene polymer according to the present invention can cause reinforcing fillers such as silica and carbon black to be homogeneously dispersed therein. A vulcanized rubber made from the resulting composition, if used for tires, can exhibit excellently balanced properties in the low rolling resistance and the wet skid performance as compared with the conventional one. The tires also exhibit improved the abrasion resistance and the strength. The modified conjugated diene polymer can be suitably used as a damper and footwear, for example. In addition to these characteristics, the capability of homogeneously dispersing the fillers can contribute to improvement of flame retarding properties, tensile strength, transparency, and the like.

Furthermore, the modified conjugated diene polymer according to the present invention exhibits excellent aggregate grip when used as an asphalt composition.

When the modified conjugated diene polymer according to the present invention is a thermoplastic resin, that resin can finely disperse polar particles and exhibits excellent compatibility with the polar resin. Therefore, the modified conjugated diene polymer according to the present invention can improve impact resistance of engineering plastic such as polyamide.

EXAMPLES

The invention is described below in detail by way of examples. However, the invention should not be construed as being limited to the following examples. In the examples below, the samples were analyzed by the following methods.
(1) Bonded Styrene Content The bonded styrene content (wt %) was determined by dissolving the sample in chloroform and measuring absorbance of a 254-nm UV light by phenyl groups of styrene ("UV-2450" manufactured by Shimazu Corporation).
(2) Styrene Chains The contents of styrene single chain having one styrene unit and a styrene long chain having eight or more connected styrene units were analyzed by gel permeation chromatography (GPC) after decomposition of styrene-butadiene copolymer with ozone, according to the method of Tanaka et al. described in Polymer, 22, 1721 (1981).
(3) Microstructure of Butadiene Unit Measured by infrared spectrum of from 600 to 1000 $cm^{-1}$ using an infrared spectrophotometer ("FT-IR230" manufactured by JASCO Corporation). The sample was dissolved in carbon disulfide and solution cells were used. The resultant absorbance was applied to the Hampton's equation to determine the microstructure of the butadiene unit, i.e., the content of 1,2-bond.
(4) Mooney Viscosity The sample was pre-heated at 100° C. for one minute and the viscosity after four minutes was measured according to JIS-K6300-1.
(5) Molecular Weight and Molecular Weight Distribution Chromatogram of the sample and standard polystyrene were measured using GPC equipped with three columns packed with polystyrene gel (TSKgel, manufactured by Tosoh Corporation). A calibration curve was produced from the measurement result of standard polystyrene, and the molecular weight and the molecular weight distribution of sample was calculated. Tetrahydrofuran (THF) was used as an eluent. 10 mg of a sample was dissolved in 20 mL of THF and the solution (200 µL) was injected into a column. The molecular weight and molecular weight distribution were measured using a RI detector ("HLC-8020" manufactured by Tosoh Corporation) under the conditions of an oven temperature at 40° C. and a THF flow rate of 1.0 mL/min.
(6) Modification Ratio The modification rate was measured by GPC column packed with silica gel as the filler using the characteristics of the modified component of being adsorbed in silica. Chromatograms of sample solutions containing a sample and a low molecular weight internal standard polystyrene were measured using the polystyrene gel GPC ("HLC-8020" manufactured by Tosoh Corporation) described in (5) and a silica column ("Zorbax" manufactured by E.I. du Pont de Nemours and Company) GPC (Column oven "CO-8020", detector "RI-8021" manufactured by Tosoh Corporation, oven temperature: 40° C., THF flow rate: 0.5 mL/min). The adsorption amount to the silica column was determined from the difference of these measurements, based on which results the modification ratio was determined. 10 mg of a sample and a 5 mg of standard polystyrene were dissolved in 20 mL of THF, and 200 µL of the solution was injected into a column. The specific procedure was followed. The modification ratio (%) was determined using the formula, $[1-(P2 \times P3)/(P1 \times P4)] \times 100$, wherein the entire peak area of the chromatogram using a polystyrene column is assumed to be 100, P1 represents the peak area of the sample, P2 represents the peak area of the standard polystyrene, the entire peak area of the chromatogram using a silica column is assumed to be 100, P3 represents the area of the sample, and P4 represents the peak area of the standard polystyrene, provided that $P1+P2=P3+P4=100$ (7) Cold Flow Property The sample was cut into a 3 cm×3 cm×8 cm rectangular parallelepiped and a 3 cm×3 cm plane was secured to a table with an inclination of 30° using a rubber cement. The cold flow property was evaluated by observing the sample after being allowed to stand at 25° C. for one hour. The results were evaluated as follows.

Excellent: The sample maintained nearly the original form.
Good: A part of sample was deformed.
Bad: The sample was considerably deformed.

Example 1

An internal volume of 10 liter heat-controllable autoclave equipped with a stirrer and a jacket was used as a reactor. The reactor was charged with 625 g of butadiene from which impurities were removed, 225 g of styrene, 5,500 g of cyclohexane, and 0.82 g of 2,2-bis(2-oxolanyl)propane as a polar substance, and the internal temperature of the reactor was maintained at 30° C. A cyclohexane solution containing 6.75 mmol of n-butyllithium as an initiator was added to the reactor. After starting the reaction, the internal temperature of the reactor began to increase by generation of heat of polymerization. 50 g of butadiene was added at a rate of 10 g/minute starting from 7 minute through 12 minute after the addition of a polymerization initiator. As a result, the final internal temperature of the reactor reached 77° C. After completing the polymerization reaction, 13.5 mmol of 1-[3-(triethoxysilanyl)-propyl]-4-methylpiperazine was added. The mixture was stirred at 75° C. for five minutes to carry out the modification reaction. After the addition of 1.8 g of antioxidant (BHT; 2,6-di-tert-butyl-4-methylphenol) to this polymer solution, the solvent was removed to obtain styrene-butadiene copolymer having a modified component (Sample A).

Sample A was analyzed by the above-mentioned method to find that the content of bonded styrene was 25 wt %, the content of bonded butadiene was 75 wt %, the content of a styrene single chain having one styrene unit was 45%, and the content of a styrene long chain having eight or more connected styrene units was 0.5%. The Mooney viscosity of the polymer was 50 and the 1,2-bond content of the microstructure of the butadiene unit was 62%. The polystyrene-based weight average molecular weight ($M_w$) was 360,000, the number average molecular weight ($M_n$) was 270,000, and the molecular weight distribution ($M_w/M_n$) was 1.33. The modification ratio was 84%.

Example 2

A styrene-butadiene copolymer having a modified component (Sample B) was obtained in the same manner as in Example 1, except for using N-[2-(trimethoxysilanyl)-ethyl]-N,N',N'-trimethylethane-1,2-diamine instead of 1-[3-(triethoxysilanyl)-propyl]-4-methylpiperazine.

As a result of analyzing Sample B, it was found that the content of bonded styrene was 25 wt %, the content of bonded butadiene was 75 wt %, and the Mooney viscosity of the polymer was 54. The 1,2-bond content of the microstructure of the butadiene unit was 60%. The polystyrene-based weight average molecular weight ($M_w$) was 390,000, the number average molecular weight ($M_n$) was 280,000, and the molecular weight distribution ($M_w/M_n$) was 1.39. The modification ratio was 78%.

Example 3

A styrene-butadiene copolymer having a modified component (Sample C) was obtained in the same manner as in Example 1, except for using 2-(trimethoxysilanyl)-1,3-dimethylimidazolidine instead of 1-[3-(triethoxysilanyl)-propyl]-4-methylpiperazine.

As a result of analyzing Sample C, it was found that the content of bonded styrene was 25 wt %, the content of bonded butadiene was 75 wt %, and the Mooney viscosity of the polymer was 52. The 1,2-bond content of the microstructure of the butadiene unit was 61%. The polystyrene-based weight average molecular weight ($M_w$) was 370,000, the number average molecular weight ($M_n$) was 270,000, and the molecular weight distribution ($M_w/M_n$) was 1.37. The modification ratio was 80%.

Example 4

A styrene-butadiene copolymer having a modified component (Sample D) was obtained in the same manner as in Example 1, except for using bis-(3-dimethylaminopropyl)-dimethoxysilane instead of 1-[3-(triethoxysilanyl)-propyl]-4-methylpiperazine.

As a result of analyzing Sample D, it was found that the content of bonded styrene was 25 wt %, the content of bonded butadiene was 75 wt %, and the Mooney viscosity of the polymer was 47. The 1,2-bond content of the microstructure of the butadiene unit was 61%. The polystyrene-based weight average molecular weight ($M_w$) was 380,000, the number average molecular weight ($M_n$) was 260,000, and the molecular weight distribution ($M_w/M_n$) was 1.46. The modification ratio was 70%.

Example 5

A polymerization reaction was carried out in the same manner as in the reaction for obtaining Sample A. After a polymerization reaction, 0.25 mmol of tetraglycidyl-1,3-bisaminomethylcyclohexane which is a tetra-functional polyepoxy compound was added to the reactor, and the mixture was stirred at 75° C. for two minutes to carry out a coupling reaction. Subsequently, a modification reaction was carried out in the same manner as in Example 1, except that the modification reaction was carried out by adding 11.48 mmol of 1-[3-(triethoxysilanyl)-propyl]-4-methylpiperazine, to obtain a styrene-butadiene copolymer having a modified component (Sample E).

As a result of analyzing Sample E, it was found that the content of bonded styrene was 25 wt %, the content of bonded butadiene was 75 wt %, and the Mooney viscosity of the polymer was 49. The 1,2-bond content of the microstructure of the butadiene unit was 62%. The polystyrene-based weight average molecular weight ($M_w$) was 350,000, the number average molecular weight ($M_n$) was 270,000, and the molecular weight distribution ($M_w/M_n$) was 1.30. The modification ratio was 83%.

Comparative Example 1

A polymerization reaction was carried out in the same manner as in Example 1, except for using a cyclohexane solution containing 8.72 mmol of n-butyllithium as an initiator, 1.05 g of 2,2-bis(2-oxolanyl)propane as a polar substance, and 4.36 mmol of tetraglycidyl-1,3-bisaminomethylcyclohexane instead of 1-[3-(triethoxysilanyl)-propyl]-4-methylpiperazine. In the same manner as in Example 1, the polymer solution was stirred at 75° C. for five minutes to carry out the modification reaction. After the addition of 1.8 g of an antioxidant (BHT) to this polymer solution, the solvent was removed to obtain styrene-butadiene copolymer having a modified component (Sample F).

As a result of analyzing Sample F, it was found that the content of bonded styrene was 25 wt %, the content of bonded butadiene was 75 wt %, and the Mooney viscosity of the polymer was 76. The 1,2-bond content of the microstructure of butadiene area was 62%. The polystyrene-based weight average molecular weight ($M_w$) was 600,000, the number average molecular weight ($M_n$) was 440,000, and the molecular weight distribution ($M_w/M_n$) was 1.36. The modification ratio was 83%.

Comparative Example 2

A styrene-butadiene copolymer having a modified component (Sample G) was obtained in the same manner as in Example 1, except for using N-(3-triethoxysilylpropyl)-4,5-dihydroimidazole instead of 1-[3-(triethoxysilanyl)-propyl]-4-methylpiperazine.

As a result of analyzing Sample Q it was found that the content of bonded styrene was 25 wt %, the content of bonded butadiene was 75 wt %, and the Mooney viscosity of the polymer was 90. The 1,2-bond content of the microstructure of the butadiene unit was 61%. The polystyrene-based weight average molecular weight ($M_w$) was 550,000, the number average molecular weight ($M_n$) was 270,000, and the molecular weight distribution ($M_w/M_n$) was 2.04. The modification ratio was 67%.

The results of preparation and analysis values of Samples A to G are shown in Table 1.

TABLE 1

| | Example | | | | | Comparative Example | |
|---|---|---|---|---|---|---|---|
| | 1 | 2 | 3 | 4 | 5 | 1 | 2 |
| Sample | A | B | C | D | E | F | G |
| Butadiene (g) | 625 | 625 | 625 | 625 | 625 | 625 | 625 |
| Additional butadiene (g) | 50 | 50 | 50 | 50 | 50 | 50 | 50 |
| Styrene (g) | 225 | 225 | 225 | 225 | 225 | 225 | 225 |
| n-butyllithium (mmol) | 6.75 | 6.75 | 6.75 | 6.75 | 6.75 | 8.72 | 6.75 |
| Polar substance amount (g) | 0.82 | 0.82 | 0.82 | 0.82 | 0.82 | 1.05 | 0.82 |
| Polyfunctional modifying agent (mmol) | — | — | — | — | 0.25 | 4.36 | — |
| Low molecular weight compound-1 (mmol) | 13.5 | — | — | — | 11.48 | — | — |
| Low molecular weight compound-2 (mmol) | — | 13.5 | — | — | — | — | — |
| Low molecular weight compound-3 (mmol) | — | — | 13.5 | — | — | — | — |
| Low molecular weight compound-4 (mmol) | — | — | — | 13.5 | — | — | — |
| Low molecular weight compound-5 (mmol) | — | — | — | — | — | — | 13.5 |
| Modification ratio (%) | 84 | 78 | 80 | 70 | 83 | 83 | 67 |

TABLE 1-continued

|  | Example | | | | | Comparative Example | |
|---|---|---|---|---|---|---|---|
|  | 1 | 2 | 3 | 4 | 5 | 1 | 2 |
| Mooney viscosity | 50 | 54 | 52 | 47 | 49 | 76 | 90 |
| Bonded styrene content (%) | 25 | 25 | 25 | 25 | 25 | 25 | 25 |
| 1,2-vinyl bond content (%) | 62 | 60 | 61 | 61 | 62 | 62 | 61 |
| Weight average molecular weight (Mw) | 360,000 | 390,000 | 370,000 | 380,000 | 350,000 | 600,000 | 550,000 |
| Number average molecular weight (Mn) | 270,000 | 280,000 | 270,000 | 260,000 | 270,000 | 440,000 | 270,000 |
| Mw/Mn | 1.33 | 1.39 | 1.37 | 1.46 | 1.30 | 1.36 | 2.04 |
| Cold flow property | Good | Good | Good | Good | Excellent | Excellent | Good |

Polar substance: 2,2-bis(2-oxolanyl) propane
Polyfunctional modifying agent: tetraglycidyl-1,3-bis(aminomethyl) cyclohexane
Low molecular weight compound-1: 1-[3-(triethoxysilanyl)-propyl]-4-methylpiperazine
Low molecular weight compound-2: N-[2-(trimethoxysilanyl)-ethyl]-N,N',N'-trimethylethane-1,2-diamine
Low molecular weight compound-3: 2-(trimethoxysilanyl)-1,3-dimethylimidazoridine
Low molecular weight compound-4: bis-(3-dimethylaminopropyl)-dimethoxysilane
Low molecular weight compound-5: N-(3-triethoxysilylpropyl)-4,5-dihydroimidazole
Cold flow property: Excellent: The sample maintained nearly the original form.
Good: A part of sample was deformed.
Bad: The sample was considerably deformed.

Examples from 6 to 10, and Comparative Examples from 3 to 4

Rubber compositions were prepared from Samples A to G (Table 1) as raw materials obtained in the above Examples and Comparative Examples with the following recipes.

| | |
|---|---|
| Modified conjugated diene copolymer | 70.0 parts |
| Natural rubber | 30.0 parts |
| Silica ("Ultrasil VN3" manufactured by Degussa) | 45.0 parts |
| Carbon black ("Seast KH" manufactured by Tokai Carbon Co., Ltd.) | 5.0 parts |
| Silane coupling agent ("Si69" manufactured by Degussa) | 4.5 parts |
| Oil ("NC140" SRAE oil manufactured by Japan Energy Corp.) | 5.0 parts |
| Zinc oxide | 3.0 parts |
| Stearic acid | 2.0 parts |
| Antioxidant (N-isopropyl-N'-phenyl-p-phenylenediamine) | 1.0 parts |
| Sulfur | 1.4 parts |
| Vulcanization accelerator (N-cyclohexyl-2-benzothiazyl sulfenamide) | 1.0 parts |
| Vulcanization accelerator (Diphenyl guanidine) | 1.5 parts |
| Total | 169.4 parts |

Kneading was carried out by the following method according to JIS K6299.

In first-stage kneading, a raw material rubber, fillers (silica and carbon black), an organosilane coupling agent, oil, zinc oxide, and stearic acid were kneaded under the conditions of a filling rate of 65% and a rotor rotation of 50/57 rpm, using a sealed kneader (internal volume: 0.3 L) equipped with a temperature controller. The temperature of sealed kneader was adjusted to obtain a composition at a discharge temperature of from 155 to 160° C. As second-stage kneading, an antioxidant was added to the composition obtained in the first stage and the mixture was again kneaded in order to improve dispersion of silica. The discharge temperature of the composition was also adjusted to from 155 to 160° C. by controlling the temperature of the sealed kneader. Sulfur and a vulcanization accelerator were added to the composition obtained by the second-stage kneading, and the mixture was kneaded in an open roll of which the temperature was set at 70° C. (third-stage kneading).

The composition obtained in the third-stage kneading was molded and vulcanized at 160° C. for a period of T90 plus 5 minutes. Properties of the resulting vulcanized rubber were measured according to the following methods.

(1) T90

After completion of the second-stage kneading, a vulcanization time required for vulcanizing 90% of the rubber (T90) was measured according to JIS K6300-1.

(2) Bound Rubber Content

About 0.2 g of the composition after the second-stage kneading was cut into about 1 mm cubes and placed in a Harris's basket (made of 100 mesh wire gauze) to measure the weight. The cubes were dipped in toluene for 24 hours and dried, and its weight was measured. From the amount of insoluble components in toluene, the amount of rubber bonded with the filler was calculated. The resulting value was regarded as the bound rubber content.

(3) Tensile Test

The tensile strength at the time of cutting a test specimen and the tensile stress at the time of 300% elongation (300% modulus) were measured according to JIS K6251.

(4) Viscoelasticity

ARES viscoelasticity tester manufactured by Rheometric Scientific Co. was used. Tan δ and modulus of elasticity (G') were measured in a torsion mode at a frequency of 10 Hz, while changing the strain at each measuring temperature (0° C. and 50° C.).

The Payne effect (ΔG') was shown by the difference between the maximum value and minimum value in the strain of from 0.1% to 10%. The smaller the Payne effect, the better the dispersibility of fillers such as silica.

The higher tan δ at the low-temperature (0° C.), the better the wet skid (grip) performance. The lower tan δ at the high-temperature (50° C.), the smaller the hysteresis loss and the smaller the rolling resistance of tires, that is, the lower the fuel consumption.

(5) Rebound Resilience

The rebound resilience at 50° C. was measured by the Lupke type rebound resilience tester according to JIS K6255.

(6) Heat Build-Up

A Goodrich flexometer was used to measure the heat build-up at a rotation of 1,800 rpm, a stroke of 0.225 inches, and a load of 55 pounds. The heat build-up was indicated by the difference of the temperature at the start (50° C.) and the temperature after 20 minutes.

(7) Abrasion Resistance

An Akron abrasion tester was used to measure the amount of abrasion at a load of 6 pounds and a rotation of 3,000 rpm. The higher the index, the better the abrasion resistance.

The results of property measurements of Examples 6 to 10 (Samples A to E) and Comparative Examples 3 to 4 (Samples F and G) are shown in Table 2.

TABLE 2

|  | Example | | | | | Comparative Example | |
|---|---|---|---|---|---|---|---|
|  | 6 | 7 | 8 | 9 | 10 | 3 | 4 |
| Sample | A | B | C | D | E | F | G |
| Compound Mooney viscosity | 62 | 60 | 63 | 58 | 66 | 62 | 70 |
| bound rubber content (%) | 64 | 61 | 62 | 60 | 65 | 43 | 57 |
| 300% Modulus (MPa) | 12.8 | 12.7 | 13.0 | 12.7 | 13.0 | 12.6 | 12.6 |
| Tensile Strength (MPa) | 22.0 | 21.5 | 22.0 | 21.0 | 22.2 | 20.5 | 19.0 |
| 50° C. rebound resilience (%) | 69.5 | 67.0 | 68.0 | 66.0 | 69.0 | 62.0 | 64.0 |
| Heat buildup ° C. | 19.0 | 19.5 | 20.0 | 20.0 | 19.0 | 23.0 | 21.0 |
| Abrasion resistance (index) | 134 | 115 | 120 | 113 | 129 | 100 | 110 |
| 0° C. tan δ (strain 1%) | 0.690 | 0.624 | 0.635 | 0.620 | 0.680 | 0.552 | 0.620 |
| 50° C. tan δ (strain 3%) | 0.068 | 0.097 | 0.077 | 0.090 | 0.066 | 0.110 | 0.102 |
| 50° C. G' (MPa) (strain 3%) | 2.30 | 2.72 | 2.65 | 2.68 | 2.40 | 3.82 | 2.83 |
| 50° C. ΔG' (MPa) | 0.33 | 0.88 | 0.51 | 0.83 | 0.45 | 1.40 | 0.90 |

Example 11 and Comparative Examples 5 and 6

Rubber compositions were prepared using Samples E, F, and G (disclosed in Table 1) as raw rubber materials with the following recipes.

| Modified conjugated diene copolymer | 100.0 parts |
|---|---|
| Silica ("Ultrasil VN3" manufactured by Degussa) | 25.0 parts |
| Carbon black ("Seast KH" manufactured by Tokai Carbon Co., Ltd.) | 20.0 parts |
| Silane coupling agent ("Si69" manufactured by Degussa) | 2.0 parts |
| Oil ("NC140" SRAE oil manufactured by Japan Energy Corp.) | 5.0 parts |
| Zinc oxide | 3.0 parts |
| Stearic acid | 2.0 parts |
| Antioxidant (N-isopropyl-N'-phenyl-p-phenylenediamine) | 1.0 parts |
| Sulfur | 1.9 parts |
| Vulcanization accelerator (N-cyclohexyl-2-benzothiazyl sulfenamide) | 1.0 parts |
| Vulcanization accelerator (Diphenyl guanidine) | 1.5 parts |
| Total | 162.4 parts |

The same methods of kneading and measuring various properties as used in Examples 6 to 10 and Comparative Examples 3 and 4 were used. The results of measuring properties are shown in Table 3.

TABLE 3

|  | Example 11 | Comparative Example 5 | Comparative Example 6 |
|---|---|---|---|
| Sample | E | F | G |
| Compound Mooney viscosity | 101 | 93 | 118 |
| bound rubber content (%) | 67 | 55 | 59 |
| 300% Modulus (MPa) | 15.2 | 14.4 | 14.8 |
| Tensile Strength (MPa) | 15.8 | 14.5 | 15.0 |
| 50° C. rebound resilience (%) | 65.5 | 58.0 | 61.0 |
| Heat buildup ° C. | 22.5 | 24.0 | 23.0 |
| Abrasion resistance (index) | 118 | 100 | 110 |
| 0° C. tan δ (strain 1%) | 0.879 | 0.951 | 0.855 |
| 50° C. tan δ (strain 3%) | 0.100 | 0.125 | 0.114 |
| 50° C. G' (MPa) (strain 3%) | 3.02 | 3.45 | 3.15 |
| 50° C. ΔG' (MPa) | 0.64 | 1.15 | 0.82 |

As shown in Tables 2 and 3, compositions made from the modified conjugated diene polymer according to the present invention by adding silica or silica and carbon black exhibited an increase in the bound rubber content and a small Payne effect (50° C. ΔG') which indicates excellent silica dispersion. In addition, the compositions showed low tan δ at the high-temperature (50° C.), a small hysteresis loss, and a small rolling resistance of tires, indicating a low fuel consumption. The compositions were further confirmed to have well-balanced low fuel consumption properties and wet skid (grip) performance (tan δ at the low-temperature). The compositions also exhibit excellent abrasion resistance.

INDUSTRIAL APPLICABILITY

In addition to vulcanized rubber composition for tire treads, the modified conjugated diene polymer according to the present invention can be used for applications such as shoes, various autoparts, and industrial goods by compounding fillers such as reinforcing silica and carbon. When the modified conjugated diene polymer according to the present invention is a thermoplastic elastomer, it can be used for an inorganic filler composition, an asphalt composition, a resin composition, an adhesive, and the like.

The invention claimed is:

1. A modified conjugated diene polymer represented by the following general formula (1), (2), (3), or (4), comprising a modifying group based on a low molecular weight compound having two or more tertiary amino groups and one or more alkoxysilyl groups in a molecule which bonds to a conjugated diene polymer obtained by polymerization of a conjugated diene compound or a conjugated diene polymer obtained by copolymerization of a conjugated diene compound and an aromatic vinyl compound,

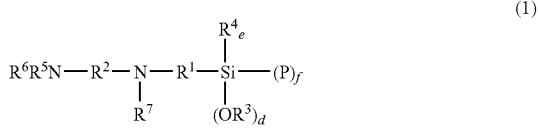

(1)

wherein
P represents the conjugated diene polymer;
R$^1$ and R$^2$, which may be the same or different from each other, represent a hydrocarbon group having 1 to 12 carbon atoms, which may contain an unsaturated bond;

$R^3$ represents a hydrocarbon group having 1 to 20 carbon atoms, which may contain an unsaturated bond;

$R^4$, $R^5$, $R^6$, and $R^7$, which may be the same or different from each other, represent a hydrocarbon group having 1 to 20 carbon atoms, which may be substituted with an organic group containing Si, O, or N and not containing an active hydrogen, and which may contain an unsaturated bond;

f is an integer of 1 to 2, d is an integer of 1 to 2, and e is an integer of 0 to 1, provided that d+e+f=3,

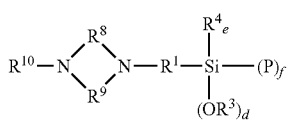

(2)

wherein

P, $R^1$, $R^3$, $R^4$, d, e, and f are the same as defined in the general formula (1), $R^8$ and $R^9$, which may be the same or different from each other, represent an aliphatic hydrocarbon group having 1 to 6 carbon atoms, which may contain an unsaturated bond; and $R^{10}$ represents a hydrocarbon group having 1 to 20 carbon atoms, which may be substituted with an organic group containing Si, O, or N and not containing an active hydrogen, and which may contain an unsaturated bond,

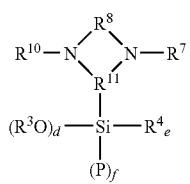

(3)

wherein

P, $R^3$, $R^4$, $R^7$, d, e, and f are the same as defined in the general formula (1);

$R^8$ and $R^{10}$ are the same as defined in the general formula (2); and $R^{11}$ represents a hydrocarbon group having 1 to 6 carbon atoms,

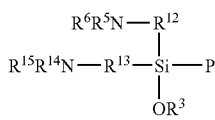

(4)

wherein

P, $R^3$, $R^5$, and $R^6$ are the same as defined in the general formula (1);

$R^{12}$ and $R^{13}$, which may be the same or different from each other, represent a hydrocarbon group having 1 to 12 carbon atoms, which may contain an unsaturated bond; and $R^{14}$ and $R^{15}$, which may be the same or different from each other, represent a hydrocarbon group having 1 to 20 carbon atoms, which may be substituted with an organic group containing Si, O, or N and not containing an active hydrogen, and which may contain an unsaturated bond.

2. The modified conjugated diene polymer according to claim 1, wherein $R^4$ in the general formula (1), (2), or (3) represents a hydrocarbon group having 1 to 20 carbon atoms, which may contain an unsaturated bond.

3. A process for producing a modified conjugated diene polymer comprising the steps of:

polymerizing a conjugated diene compound, or copolymerizing a conjugated diene compound and an aromatic vinyl compound in a hydrocarbon solvent using an alkali metal initiator and/or an alkaline earth metal initiator; and reacting active terminals of the resulting polymer with a low molecular weight compound represented by the following general formula (5), (6), (7) or (8) or a condensate thereof, having two or more tertiary amino groups and one or more alkoxysilyl groups in a molecule,

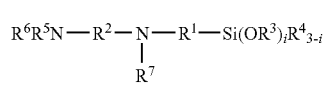

(5)

wherein $R^1$ and $R^2$, which may be the same or different from each other, represent a hydrocarbon group having 1 to 12 carbon atoms, which may contain an unsaturated bond;

$R^3$ represents a hydrocarbon group having 1 to 20 carbon atoms, which may contain an unsaturated bond;

$R^4$, $R^5$, $R^6$, and $R^7$, which may be the same or different from each other, represent a hydrocarbon group having 1 to 20 carbon atoms, which may be substituted with an organic group containing Si, O, or N and not containing an active hydrogen, and which may contain an unsaturated bond; and i is an integer of 1 to 3,

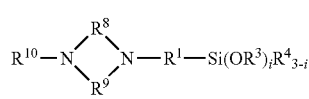

(6)

wherein $R^1$, $R^3$, and $R^4$ are the same as defined in the general formula (5);

$R^8$ and $R^9$, which may be the same or different from each other, represent an aliphatic hydrocarbon group having 1 to 6 carbon atoms, which may contain an unsaturated bond; and $R^{10}$ represents a hydrocarbon group having 1 to 20 carbon atoms, which may be substituted with an organic group containing Si, O, or N and not containing an active hydrogen, and which may contain an unsaturated bond; and i is an integer of 1 to 3,

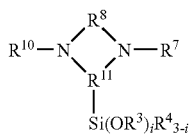
(7)

wherein
R$^3$, R$^4$, and R$^7$ are the same as defined in the general formula (5);
R$^8$ and R$^{10}$ are the same defined in the general formula (6); and
R$^{11}$ represents a hydrocarbon group having 1 to 6 carbon atoms; and
i is an integer of 1 to 3,

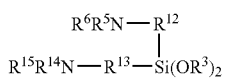
(8)

wherein
R$^3$, R$^5$, and R$^6$ are the same as defined in the general formula (5);
R$^{12}$ and R$^{13}$, which may be the same or different from each other, represent a hydrocarbon group having 1 to 12 carbon atoms, which may contain an unsaturated bond;
R$^{14}$ and R$^{15}$, which may be the same or different from each other, represent a hydrocarbon group having 1 to 20 carbon atoms, which may be substituted with an organic group containing Si, O, or N and not containing an active hydrogen, and which may contain an unsaturated bond.

4. The process for producing the modified conjugated diene polymer according to claim 3, wherein the low molecular weight compound is represented by the general formula (5), (6), or (7) or a condensate thereof, in which R$^4$ represents a hydrocarbon group having 1 to 20 carbon atoms, which may contain an unsaturated bond.

5. The process for producing the modified conjugated diene polymer according to claim 3, wherein the low molecular weight compound is at least one selected from the group consisting of
1-[3-(trialkoxysilanyl)-propyl]-4-alkylpiperazine,
1-[3-(alkyldialkoxysilanyl)-propyl]-4-alkylpiperazine,
1-[3-(trialkoxysilanyl)-propyl]-3-alkylimidazolidine,
1-[3-(alkyldialkoxysilanyl)-propyl]-3-alkylimidazolidine,
1-[3-(trialkoxysilanyl)-propyl]-3-alkylhexahydropyrimidine,
1-[3-(alkyldialkoxysilanyl)-propyl]-3-alkylhexahydropyrimidine,
3-[3-(trialkoxysilanyl)-propyl]-1-alkyl-1,2,3,4-tetrahydropyrimidine, and
3-[3-(alkyldialkoxysilanyl)-propyl]-1-alkyl-1,2,3,4-tetrahydropyrimidine.

6. The process for producing the modified conjugated diene polymer according to any one of claims 3 to 5, wherein the active terminals of the polymer or the conjugated diene polymer are coupled with a polyfunctional modifying agent prior to, subsequent to, or concurrently with reacting the active terminals of the polymer with the low molecular weight compound.

7. The process for producing the modified conjugated diene polymer according to claim 6, wherein the polyfunctional modifying agent is a glycidyl compound, which contains an amino group in a molecule.

8. A modified conjugated diene polymer composition comprising:
1 to 150 parts by weight of a reinforcing filler and 0.1 to 20 parts by weight in total of a vulcanizing agent and a vulcanizing accelerator, based on 100 parts by weight of a rubber component comprising the modified conjugated diene polymer according to claim 1 or the modified conjugated diene polymer obtained by the process according to claim 3.

9. A tire comprising the modified conjugated diene polymer composition according to claim 8.

* * * * *